US009800076B2

(12) United States Patent
Jadidian et al.

(10) Patent No.: US 9,800,076 B2
(45) Date of Patent: Oct. 24, 2017

(54) WIRELESS POWER TRANSFER

(71) Applicant: Massachusetts Institute of Technology, Cambridge, MA (US)

(72) Inventors: Jouya Jadidian, Stoneham, MA (US); Dina Katabi, Cambridge, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 465 days.

(21) Appl. No.: 14/502,191

(22) Filed: Sep. 30, 2014

(65) Prior Publication Data
US 2015/0236526 A1 Aug. 20, 2015

Related U.S. Application Data

(60) Provisional application No. 62/046,999, filed on Sep. 7, 2014, provisional application No. 61/939,801, filed on Feb. 14, 2014.

(51) Int. Cl.
*H02J 7/00* (2006.01)
*H02J 5/00* (2016.01)
(Continued)

(52) U.S. Cl.
CPC .............. *H02J 7/007* (2013.01); *H02J 5/005* (2013.01); *H02J 7/025* (2013.01); *H02J 17/00* (2013.01);
(Continued)

(58) Field of Classification Search
CPC .. H02J 17/00; H02J 5/005; H02J 7/025; H02J 3/01; H01F 38/14; B60L 11/182;
(Continued)

(56) References Cited

U.S. PATENT DOCUMENTS 7,211,986 B1  5/2007  Flowerdew et al.
7,248,017 B2  7/2007  Cheng et al.
(Continued)

FOREIGN PATENT DOCUMENTS

EP  2211438  8/2010
EP  2518861  10/2012
(Continued)

*Primary Examiner* — Jared Fureman
*Assistant Examiner* — Rafael Pacheco
(74) *Attorney, Agent, or Firm* — Occhiuti & Rohlicek LLP

(57) ABSTRACT

A method includes determining, by a base station including a number of transmitting coils, a first number of mutual magnetic parameters, each mutual magnetic parameter being associated with one of the transmitting coils and a receiving coil of at least one receiving coil associated with at least one electronic device remotely located from and to be remotely charged by the base station, determining a plurality of control signals based on the first number of mutual magnetic parameters, each control signal being associated with a corresponding one of the transmitting coils, providing each control signal to a driving circuit coupled to the control signal's corresponding transmitting coil, and using each control signal to cause the driving circuit coupled to the control signal's corresponding transmitting coil to cause a current with a magnitude and phase determined from the control signal to flow in the corresponding transmitting coil.

32 Claims, 9 Drawing Sheets

(51) Int. Cl.
*H02J 7/02* (2016.01)
*H02M 7/217* (2006.01)
*H02J 17/00* (2006.01)

(52) U.S. Cl.
CPC ..... *H02M 7/217* (2013.01); *H02J 2007/0096* (2013.01)

(58) Field of Classification Search
CPC .............. B60L 11/1829; B60L 11/1831; Y02T 90/122; H04B 5/0037
See application file for complete search history.

(56) References Cited

U.S. PATENT DOCUMENTS

| | | | |
|---|---|---|---|
| 7,893,564 | B2 | 2/2011 | Bennett |
| 8,169,185 | B2 | 5/2012 | Partovi et al. |
| 8,258,653 | B2 | 9/2012 | Kitamura et al. |
| 9,124,123 | B2 | 9/2015 | Jung |
| 9,425,864 | B2 | 8/2016 | Staring |
| 9,443,651 | B2 | 9/2016 | Kagami et al. |
| 2010/0033021 | A1* | 2/2010 | Bennett .................. H02J 17/00 307/104 |
| 2011/0133691 | A1* | 6/2011 | Hautanen .............. H02J 7/0004 320/108 |
| 2011/0156493 | A1 | 6/2011 | Bennett |
| 2012/0169139 | A1 | 7/2012 | Kudo |
| 2012/0293008 | A1* | 11/2012 | Park ........................ H02M 1/14 307/104 |
| 2013/0002034 | A1* | 1/2013 | Onizuka ................. H02J 5/005 307/104 |
| 2013/0043734 | A1 | 2/2013 | Stone et al. |
| 2013/0057207 | A1* | 3/2013 | Ichikawa ............... B60K 6/445 320/108 |
| 2013/0193773 | A1 | 8/2013 | Van Wageningen |
| 2013/0207599 | A1 | 8/2013 | Ziv et al. |
| 2013/0278209 | A1 | 10/2013 | Von Novak, III |
| 2014/0084703 | A1 | 3/2014 | Hall et al. |
| 2014/0091640 | A1 | 4/2014 | Scholz et al. |
| 2014/0117930 | A1* | 5/2014 | Imazu ..................... H02J 5/005 320/108 |
| 2015/0236513 | A1 | 8/2015 | Covic et al. |
| 2015/0302983 | A1 | 10/2015 | Park et al. |

FOREIGN PATENT DOCUMENTS

| | | |
|---|---|---|
| EP | 2688181 | 1/2014 |
| WO | 2012/150293 | 11/2012 |
| WO | 2013/122483 | 8/2013 |
| WO | 2014/109460 | 7/2014 |

* cited by examiner

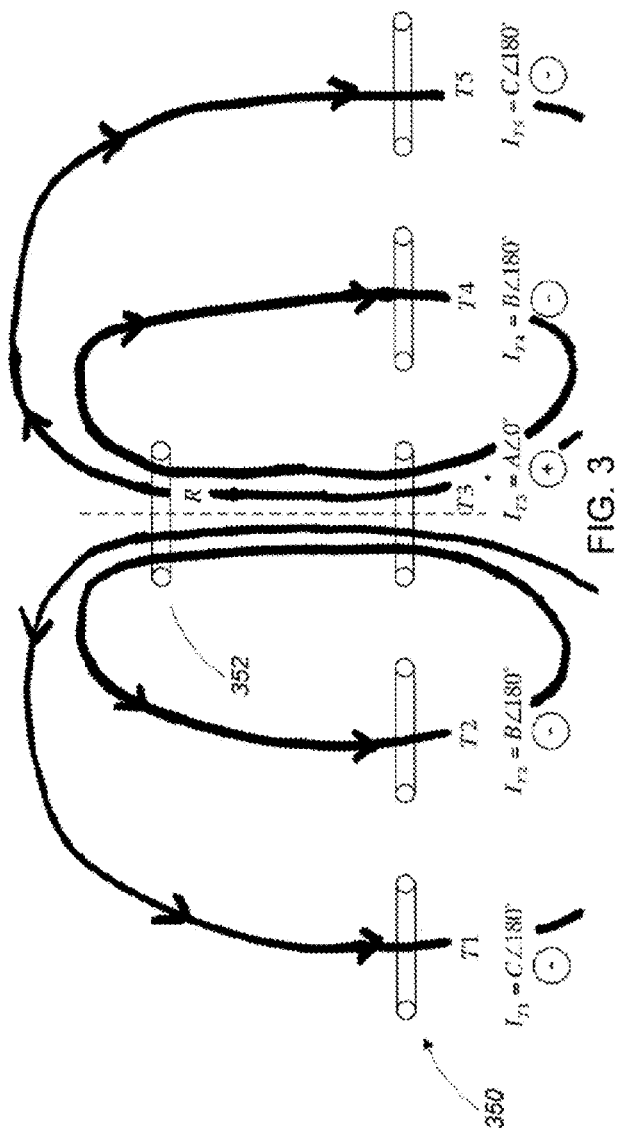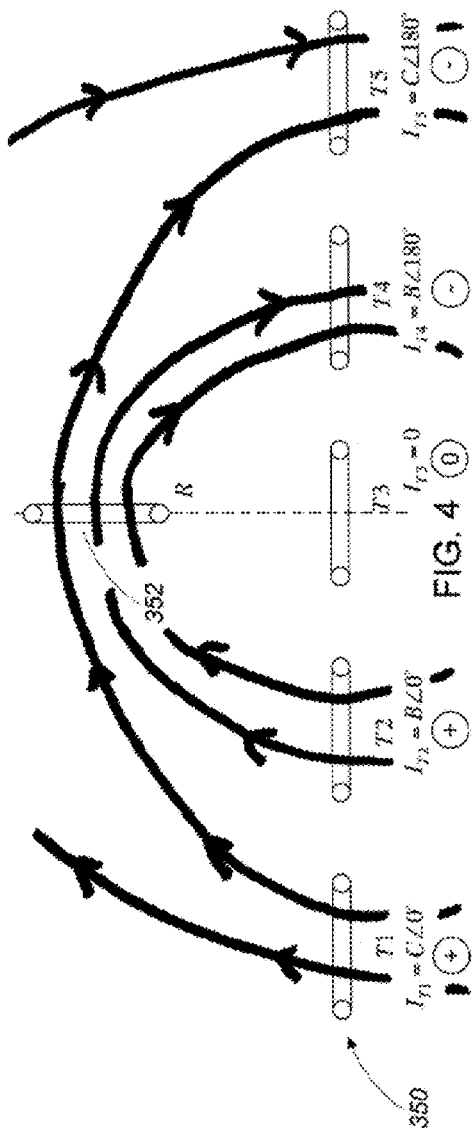

WIRELESS POWER TRANSFER

CROSS-REFERENCE TO RELATED APPLICATIONS

This application claims the benefit of U.S. Provisional Application No. 61/939,801, filed Feb. 14, 2014, and U.S. Provisional Application No. 62/046,999, filed Sep. 7, 2014, the contents of each being incorporated herein by reference

STATEMENT AS TO FEDERALLY SPONSORED RESEARCH

This invention was made with government support under CNS-1116864 awarded by the National Science Foundation. The government has certain rights in the invention.

BACKGROUND

This invention relates to wireless power transfer, and in particular relates to wireless power transfer using multiple controlled sources.

Wireless power transfer promises to revolutionize mobile communication and enable smart phones and other portable wireless devices to be permanently unplugged. Wireless chargers are now available for many mobile phones, for example, in the form of charging pads on which a user places a phone. Power is transferred using magnetic fields generated in transmitting coils in the charging pad and received at a receiving coil in the device being charged. However, state-of-art phone chargers are limited to distances of one or few centimeters, and require the device being charged to be carefully aligned with the charging pad.

SUMMARY

In one aspect in general, an approach disclosed herein achieves wireless power transfer, for example, for charging a battery of a personal wireless device, while overcoming limitations related to distance and/or orientation of currently available approaches. Generally, the approach makes use of a base station that controls a number of transmitting coils. The base station adapts the signals driving individual transmitting coils to efficiently transfer power via a receiving coil at a wireless device, which generally is situated at an unknown location and orientation in the near field of the transmit coils. In some examples, the magnitude and phase (e.g., at a fixed resonant frequency) of an alternating voltage driving each of the transmitting coils is controlled by the base station to match the location and orientation of the receiving coil, for example, by optimizing the induced power flow to the wireless device or to a load in the wireless device. In some examples, control signals for the transmit coils are determined by the base station according to estimates of magnetic coupling (e.g., mutual inductance) between each transmitting coil and the receiving coil, as well as magnetic coupling between the transmit coils.

In some examples, the estimates of the magnetic coupling between the transmitting coils and the receiving coil are determined by the base station by monitoring load on the transmit coils. In some implementations, each transmit coil is used independently at times (i.e., the other coils are not driven) and a load of that transmit coil, which is coupled to the receive coil and the internal load in the wireless device, is measured and used to infer the magnetic coupling. In some examples, the internal load at the wireless device is used in inferring the magnetic coupling. This internal load may be known a priori by the base station, may be transmitted over separate communication channel (e.g., Bluetooth) from the wireless device to the base station, or preferably may be signaled from the wireless device to the base station by modulating its load characteristics in a manner that can be detected by the base station. In this latter case, the magnetic coupling between the transmit coils of the base station and the receiving coil are used both as a power transfer channel from the base station to the wireless device as well as a communication channel from the wireless device back to the base station. This communication channel may also be used to signal presence of a device in need of power transfer as well as communication of load or channel parameters known to the wireless device to the base station. In yet other examples, the magnetic channel may be used for bidirectional communication, for example, with the base station modulating the magnetic signal it produces.

In some examples, the transmit coils of the base station are integrated in a planar configuration, for example, in a "pad" or in an arrangement for installation under a desktop. However, other configuration of transmit coils, which are not necessarily co-planar can also be used.

The approach may be adapted to a wireless device having multiple receiving coils (e.g., in different orientations) or to concurrent power transfer to multiple separate devices. For example, magnetic coupling between each combination of transmit coil and receiving coil may be estimated by the base station separately using the techniques described for one receiving coil, and in at least some examples, magnetic coupling being receiving coils is also estimated, for use in determining an efficient driving of the transmit coils to transfer power to the multiple receiving coils.

The inference of magnetic coupling by driving individual transmit coils is only one way of inferring the load at the receiving coil. For example, other approaches may use subsets of multiple transmit coils, or even all the coils, concurrently in the process of inferring the magnetic coupling.

The transmit coils of the base station form controlled magnetic sources. Other configurations of electrical or electronic components may form magnetic sources that are controlled in a similar manner. For example, configurations of electrical conductors may be used to induce magnetic fields without necessarily forming physical circular "coils." Therefore, as used herein, the term "coil" should be understood very broadly to include any configuration of an electrical conductor that can be used to induce a magnetic field. Furthermore, other forms of electro-magnetic elements that are coupled (e.g., in a near field) in a like manner may be substituted for the described coils and controlled using the same or essentially the same approach.

The approach may be used for charging a battery of a wireless device, but it should be understood that the power transfer from the "charging" station to the wireless device may be used for other purposes than charging. For example, the approach may be used to directly power electrical or electronic components in the wireless device.

In another aspect, in general, a method includes determining, by a base station (e.g., a charging device or other form of power transmitting device) that has multiple transmitting coils, a mutual magnetic parameter of each of the transmitting coils with at least one receiving coil of at least one electronic wireless device remotely located from and to be remotely charged by the base station. Further parameters for each of the number of transmitting coils are estimating by the base station using the determined mutual magnetic parameters for each of the number of transmitting coils.

These estimated further parameters are applied to all or selected transmitting coils to provide magnetic channels between each of the all or selected transmitting coils and the at least one receiving coil to perform a wireless energy transfer to the at least one receiving coil.

Aspect may include one or more of the following features.

The mutual magnetic parameter is a mutual inductance.

The estimated further parameters for each of the number of transmitting coils include at least one of a coil current, a coil voltage, and a voltage or current phase.

The determining, estimating and providing by the base station is performed only after receiving from the electronic wireless device an indication that the electronic wireless device is in a range for charging and needs to be charged. In some examples, the indication is based at last in part on the value of a load of the at least one receiving coil of the at least one electronic wireless device.

The determining, estimating and applying are repeated in a predefined time interval. In some examples, the predefined time interval is between two and ten seconds.

The determining, estimating and applying are performed for any orientation of the electronic wireless device relative to the base station.

The electronic wireless device is a mobile phone, a smart phone, a tablet, a camera-phone or a portable computer.

In another aspect, in general, a base station is configured to perform all the steps of any of the methods described above. In some examples, the base station includes a programmable processor and an instruction memory holding instructions for causing the processor to perform at least some of the steps.

In another aspect, in general, software stored on a tangible machine-readable medium includes instructions for causing a processor to perform some or all of the steps of any of the methods described above.

In another aspect, in general, a base station includes a number of transmit coils, a controller and a channel estimator/detector coupled to the coils. The controller drives the coils according to driving parameters (e.g., voltage or current magnitude and phase) determined according to magnetic channel parameters stored in a memory. The channel estimator senses characteristics (e.g., voltage and current) on the coils as part of a process to estimate the magnetic channel parameters.

In another aspect, in general, a wireless device includes circuitry for receiving power via a magnetically coupled coil, and for communicating information via the coil to a power transmitting device. This information may include load parameters that are used by the power transmitting device to adapt the manner in which it transmits power to the wireless device.

In an aspect, in general, a method includes determining, by a base station including a number of transmitting coils, a first number of mutual magnetic parameters, each mutual magnetic parameter of the first number of mutual magnetic parameters being associated with a transmitting coil of the number of transmitting coils and a receiving coil of at least one receiving coil associated with at least one electronic device remotely located from and to be remotely charged by the base station, determining, by the base station, a number of control signals based on the first number of mutual magnetic parameters, each control signal of the number of control signals being associated with a corresponding transmitting coil of the number of transmitting coils, providing each control signal of the number of control signals to a driving circuit coupled to the control signal's corresponding transmitting coil, and using each control signal of the number of control signals to cause the driving circuit coupled to the control signal's corresponding transmitting coil to cause a current with a magnitude and phase determined from the control signal to flow in the corresponding transmitting coil.

Aspects may include one or more of the following features.

The method may also include determining, by the base station, a second number of mutual magnetic parameters, each mutual magnetic parameter of the second number of mutual magnetic parameters being associated with a different pair of transmitting coils of the number of transmitting coils, wherein determining the number of control signals is further based on the second number of mutual magnetic parameters. The at least one receiving coil may include a number of receiving coils. The method may also include determining, by the base station, a third number of mutual magnetic parameters, each mutual magnetic parameter of the third number of mutual magnetic parameters being associated with a different pair of receiving coils of the number of receiving coils, wherein determining the number of control signals if further based on the third number of mutual magnetic parameters.

The number of control signals may be determined to achieve a maximum wireless energy transfer to the at least one of the receiving coils subject to a power constraint at the base station. The method may include receiving an indication of a power requirement at the base station from the electronic device, wherein determining the number of control signals is further based on the indication. The number of control signals may be determined such that the power requirement is achieved at the receiver. The method may include receiving an indication of an impedance at the receiver from the receiver, wherein determining the number of control signals is further based on the indication of the impedance at the receiver. The number of control signals may be determined such that a power requirement is achieved at the receiver.

Each mutual magnetic parameter may include a mutual inductance. Each control signal of the number of control signals may include at least one of a coil current magnitude, a coil current phase, a coil voltage magnitude, and a coil voltage phase. The method may include receiving an indication that the electronic device is in a range for charging and needs to be charged from the electronic device prior to determining the mutual magnetic parameters. The indication may be based at last in part on the value of a load of the at least one receiving coil of the at least one electronic device. The determining, providing, and using may be repeated in a predefined time interval. The predefined time interval may be between two and ten seconds.

The determining, providing, and using may be performed for any orientation of the electronic device relative to the base station. The electronic device may be a mobile phone, a smart phone, a tablet, a camera-phone or a portable computer.

In another aspect, in general, a wireless energy transfer apparatus includes a base station including a number of transmitting coils, a number of driving circuits, and a controller. Each driving circuit of the number of driving circuits is coupled to a corresponding transmitting coil of the number of transmitting coils. The controller is configured to determine a first number of mutual magnetic parameters, each mutual magnetic parameter of the first number of mutual magnetic parameters being associated with a transmitting coil of the number of transmitting coils and a receiving coil of at least one receiving coil associated with at least one electronic device remotely located from and to be remotely charged by the base station, determine a number of control signals based on the first number of mutual magnetic parameters, each control signal of the number of control signals being associated with a corresponding transmitting coil of the number of transmitting coils, provide each control signal of the number of control signals to the driving circuit coupled to the control signal's corresponding transmitting coil, and use each control signal of the number of control signals to cause the driving circuit coupled to the control signal's corresponding transmitting coil to cause a current with a magnitude and phase determined from the control signal to flow in the corresponding transmitting coil.

Aspects may include one or more of the following features.

The controller may be configured to determine a second number of mutual magnetic parameters, each mutual magnetic parameter of the second number of mutual magnetic parameters being associated with a different pair of transmitting coils of the number of transmitting coils, wherein determining the number of control signals is further based on the second number of mutual magnetic parameters. The at least one receiving coil may include a number of receiving coils. The controller may be further configured to determine a third number of mutual magnetic parameters, each mutual magnetic parameter of the third number of mutual magnetic parameters being associated with a different pair of receiving coils of the number of receiving coils, wherein determining the number of control signals if further based on the third number of mutual magnetic parameters.

The controller may determine the number of control signals to achieve a maximum wireless energy transfer to the at least one of the receiving coils subject to a power constraint at the base station. The controller may receive an indication of a power requirement at the base station from the electronic device and determines the number of control signals based at least in part on the indication. The controller may determine the number of control signals such that the power requirement is achieved at the receiver. The controller may receive an indication of an impedance at the receiver from the receiver and the controller determines the number of control signals is based at least in part on the indication of the impedance at the receiver. The controller may determine the number of control signals such that a power requirement is achieved at the receiver. Each mutual magnetic parameter may include a mutual inductance.

Each control signal of the number of control signals may include at least one of a coil current magnitude, a coil current phase, a coil voltage magnitude, and a coil voltage phase. The controller may receive an indication that the electronic device is in a range for charging and needs to be charged from the electronic device prior to determining the mutual magnetic parameters. The indication may be based at last in part on the value of a load of the at least one receiving coil of the at least one electronic device. The controller may be configured to repeat the determining, providing, and using in a predefined time interval. The predefined time interval may be between two and ten seconds. The controller may be configured to perform the determining, providing, and using for any orientation of the electronic device relative to the base station.

The electronic device may be a mobile phone, a smart phone, a tablet, a camera-phone or a portable computer.

Aspects may have one or more of the following advantages.

The approach provides a way of automatically adapting to an unknown location and/or orientation of a power receiving device to maximize power transfer to the device. Furthermore, the approach provides a way of adapting to a changing location and/or orientation of the power receiving device.

The approach adapts to an unknown or changing orientation of a wireless device while maintaining efficient power transfer. For example, even of a receiver coil is at right angles to a planar arrangement of transmit coils, the base station may be able to adapt the driving signals to the transmit coils to cause transfer power via the receive coil.

The approach does not require information about the location of the wireless device (i.e., the location of the receiving coils) because the approach estimates the magnetic coupling and adapts accordingly, independent of the physical location of the device.

Aspects of the approach make use of characteristics of near-field magnetic coupling between coils rather than relying of explicit directional characteristic of a radiating field.

The approach does not require a separate communication channel to feed back information about load, location, orientation, device type, etc. because such information may be transmitted from the wireless device to the base station via a communication channel using the magnetic coupling between the power transmit and receive coils.

The approach provides efficient power transfer by determining an amount of power (e.g., as a result of determining a driving voltage) for each of the transmit coils, thereby generally providing a different amount of power via each of coils. This approach can provide higher efficiency that achievable by apportioning power equally (e.g., by using the same driving voltage amplitude) to each of the transmitting coils.

The approach makes use of a computationally efficient way of determining the driving signals once the magnetic coupling between coils is estimated. For example, the computation involves a limited number of matrix operations.

The approach adapts to objects that come between a base station and a wireless device even if the object is magnetic or conductive and affects the magnetic coupling characteristics between coils.

The approach provides a way of transferring power to a wireless device from a base station at a greater distance (e.g., √2 meter) and/or at a greater efficiency than available today for the same power input.

The amount of magnetic flux delivered to the receiver coil by the approach is significantly higher than would be the case if only a single transmitter coil were used, despite the fact that the same amount of input power is consumed in both cases.

Other features and advantages of the invention are apparent from the following description, and from the claims.

DESCRIPTION OF DRAWINGS

FIG. 3 is a first configuration of transmit coils and a receiver coil.

FIG. 4 is a second configuration of transmit coils and a receiver coil.

DESCRIPTION

1 Overview

Figure 1:
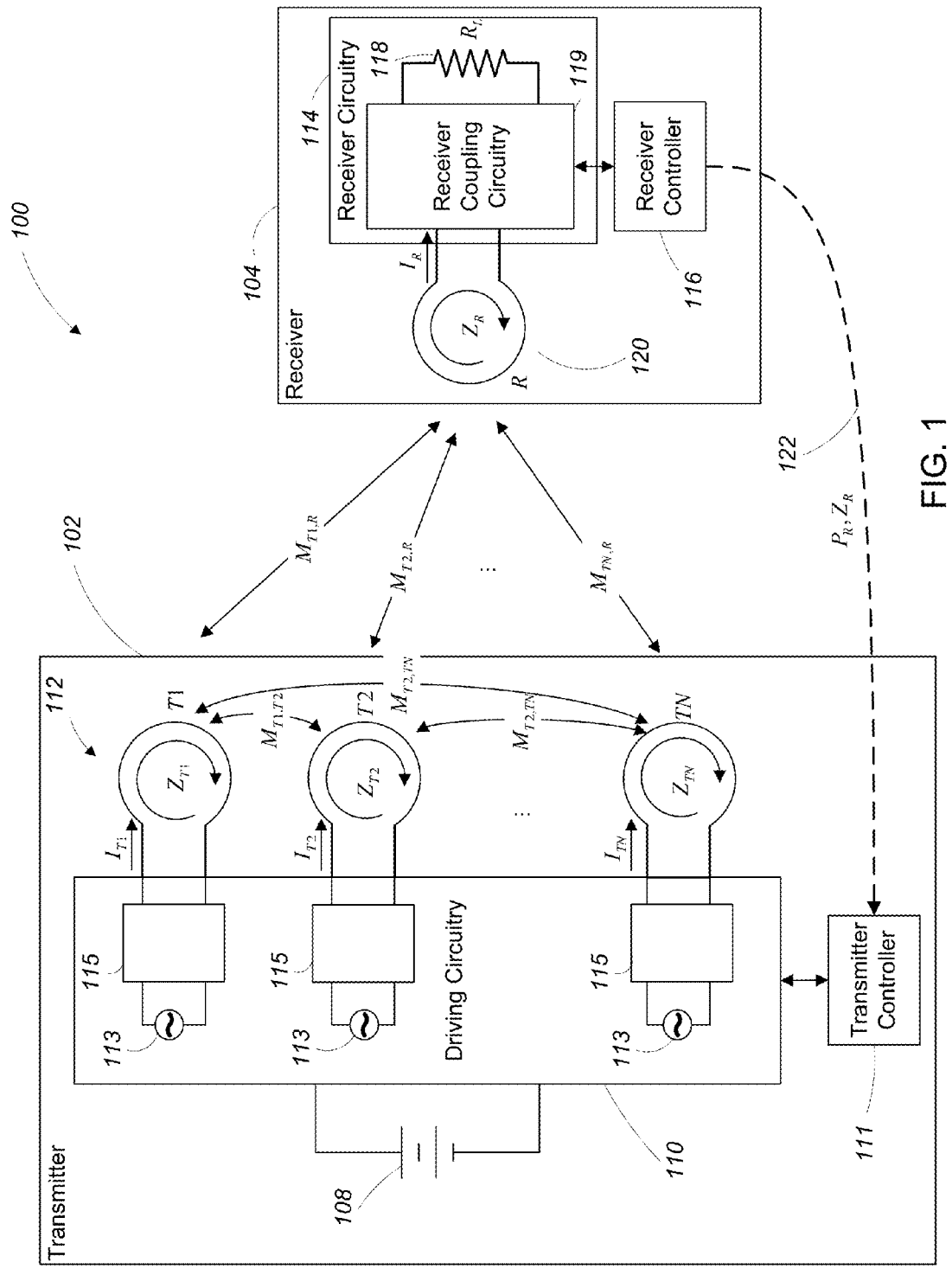
FIG. 1 is a block diagram of a single receiver wireless power transfer system.

Referring to FIG. 1, an embodiment of a wireless power transfer system 100 is configured to transfer power without requiring a conductive link (i.e., a charging wire) to device(s) receiving power, for example, for charging a battery of a personal wireless device, while overcoming limitations related to distance and/or orientation of currently available approaches. The wireless power transfer system 100 includes a transmitter 102 and one or more receivers 104, a representative one of which is shown in FIG. 1. The transmitter 102 is configured to wirelessly transfer power to the receiver 104 using magnetic coupling between the transmitter 102 and the receiver 104. The description below first addresses the single-receiver case, and then provides further description of embodiments that support concurrent power transfer to multiple receivers. The description below also generally relates to inductive wireless power transfer using resonantly coupled transmitter coils and receiver coils. However, it is noted that the wireless power transfer can easily be adapted to perform inductive wireless power transfer using transmitter coils and receiver coils which are not resonantly coupled.

The transmitter 102 includes a power source 108 (e.g., a battery, a DC output of a power supply powered by utility power, a photovoltaic power source, etc), driving circuitry 110, a transmitter controller 111, and a plurality of transmit coils 112, labeled T1, . . . , TN. In some examples, for each transmit coil 112, the driving circuitry 110 includes an AC power source 113 (driven by the power source 108) and a transmit coil circuit 115. The AC power sources 113 operate at a common frequency, but in general have phase and voltage that is different for each transmit coil, with the phases and/or voltages being determined according to factors including the circuit characteristics of the receiver(s), the power requirements of the receiver(s), and the relative location and orientation (pose) of the receiver(s) relative to the transmitter. In some examples, the transmitter 106 is included in wireless charging base station such as an under-desk wireless charging base station.

The receiver 104 includes a receiver coil R 120, receiver circuitry 114, a receiver controller 116. The receiver circuit 114 is represented as a receiver coupling circuit 119 and a load to be powered, here illustrated as a load resistance 118, $R_L$, R. (In the cases where one receiver is present, the symbol R is used to refer to the receiver coil, or the receiver associated with that coil, interchangeably based on the context; with multiple receivers, the symbols, R1, R2, Rj, RM etc. are used to distinguish the multiple receivers and their coils). In some examples, the receiver 104 is included in a battery powered electronic device such as a cellular telephone, a laptop computer, or a tablet computer, and the load represents a charging mechanism of the receiver's battery.

A particular magnetic coupling, or "mutual inductance", (a real number, for example, expressed in units on henrys, or equivalently volt-seconds per ampere), exists between any pair of coils, for example, between the receiver coil R 120 in FIG. 1 and each of the transmitter coils Ti 112. For example, a first mutual inductance $M_{T1,R}$ exists between a first transmit coil, T1 and the receiver coil, R. A second mutual inductance $M_{T2,R}$ exists between a second transmit coil, T2 and the receiver coil, R. A third mutual inductance $M_{TN,R}$ exists between an $N^{th}$ transmit coil, TN and the receiver coil, R. A different magnetic coupling also exists between each pair of transmit coils 112. For example, a fourth mutual inductance $M_{T1,T2}$ exists between the first transmit coil, T1 and the second transmit coil, T2. A fifth mutual inductance $M_{T2,TN}$ exists between the second transmit coil, T2 and the $N^{th}$ transmit coil, TN. Finally, a sixth mutual inductance $M_{T1,TN}$ exists between the first transmit coil, T1 and the $N^{th}$ transmit coil, TN. Of course, when there are N transmit coils and a single receive coil, there are N(N−1)/2 mutual inductances between the transmit coils and N mutual inductances between the transmit coils and the receive coil in the system 100 shown in FIG. 1.

Some factors that may affect the magnetic coupling between two coils include the distance between the two coils, the shape of the coils (e.g., diameter of a circular coil), a ratio of a number of turns in the two coils, a permeance of the space between the two coils, the presence of other coils in proximity to the two coils, and an orientation of the two coils relative to one another.

Each transmit coil 112 in the system 100 is associated with its corresponding transmit coil circuit 115, the transmit coil circuit 115 and the coil itself having a combined overall loop impedance. The overall loop impedance associated with a given transmit coil Ti is denoted $Z_{Ti}$ and the overall loop impedance associated with the receiver coil R is denoted $Z_R$. These impedances are represented as complex numbers (in units of ohms, or equivalently volts per ampere), and are frequency dependent (i.e., $Z_R(\omega)$). Unless otherwise indicated, we consider the impedances at the frequency $\omega_T$ at which the transmitter operates (e.g., a frequency in a range of 100 kHz to 50 MHz). In general, the transmit and receive loops are tuned to the operating frequency at which $Z(\omega_T)$ is very small and generally substantially real. In the case of the transmit coils, the impedance $Z_{Ti}$ is the ratio of the driving voltage $V_{Ti}$ (represented as a complex quantity representing the amplitude and phase of the voltage source) and the current $I_{Ti}$ assuming that there is no load induce on the transmit coil Ti from the other coils in the system. In the case of a receiver coil, the impedance $Z_R$ is the ratio of the induce electromotive force $\epsilon_R$ caused by magnetic flux through the receive coil and the resulting current $I_R$.

In at least some embodiments, the system 100 includes a communications channel 122 over which the receiver controller 116 reports information from the receiver that is used by a transmit controller 111 to adjust the drive of the transmit coils. For example, the information reported can include the receiver's overall loop impedance $Z_R$ (or an equivalent quantity from which the loop impendence may be determined) and a target power $P_R$ to the transmitter 102, as is described in greater detail below. Various approaches to implementing the communication channel may be used. For instance, the communications channel 122 may be either an in-band communications channel or an out-of-band communications channel. An example of in-band communication is generally based on modulation of the loading effect of the receiver on one or more of the transmit coils. An example of an out-of-band communication channel may include a radio frequency channel (e.g., WiFi, Bluetooth, etc.) or an optical link (e.g., Infra-Red (IR)). In some examples, a forward channel from the transmitter to the receiver is also used, for example, to control operation of the receiver. Note that for various applications, different information may be needed by the transmitter. For example, feedback of the receiver's loop impedance $Z_R$ may not be required by the transmitter when there is only a single receiver coil and a goal is to maximize receiver power subject to an input power limit to the transmitter.

In operation, the transmitter controller 111 operates in a power transmission mode, in which it controls the drive of each transmitter coil to achieve efficient power transfer, or in an estimation mode, in which it determines estimates of certain mutual inductances between coils, for instance an estimate of the mutual inductances $M_{Ti,R}$ between each of the transmit coils 112 Ti and the receiver coil 120 R. In some alternative embodiments, the functions of these two modes may be performed concurrently. As part of the estimation, in at least some implementations, based on the determined mutual inductances, the receiver loop impedance $Z_R$, and a target power in the receiver $P_R$, the transmitter controller 111 computes a target current $I_R$ (or an equivalent quantity such as a target electromotive force $\epsilon_R$) in the receiver 104. The transmitter controller 111 then determines an optimal set of currents $I_{T1} \ldots I_{TN}$ for the transmit coils 112 which induce the target current $I_R$ (and therefore the target power $P_R$) in the receiver circuit while at the same time minimizing the input power to the transmitter 102. The transmitter controller 111 also determines a set of voltages $V_{T1}, V_{T2}, \ldots V_{TN}$ (i.e., complex quantities representing magnitude and phase of the voltages) which, when applied to the circuits of the transmit coils 112, achieve the optimal set of currents $I_{T1} \ldots I_{TN}$.

In at least some embodiments, to transfer power to the receiver 104 in the presence of changing conditions (e.g., position, intervening objects, etc.) while also minimizing power loss in the transmitter 102, the transmitter 102 operates according to a protocol which includes repeatedly performing a magnetic channel estimation step and a transmit coil current update step in the estimation mode introduced above. Very generally, the magnetic channel estimation step utilizes information received from the receiver 104 to determine estimates of the mutual inductances $M_{T1,R} \ldots M_{TN,R}$ between the transmit coils 112 and the receiver coil 120. The transmit coil current update step utilizes information received from the receiver 104 and the estimates of the mutual inductances $M_{T1,R} \ldots M_{TN,R}$ to determine the optimal set of currents $I_{T1} \ldots I_{TN}$ for the transmit coils 112 which efficiently transfer power to the receiver 104.

2 Receiver and Transmit Circuit Model

Figure 2:
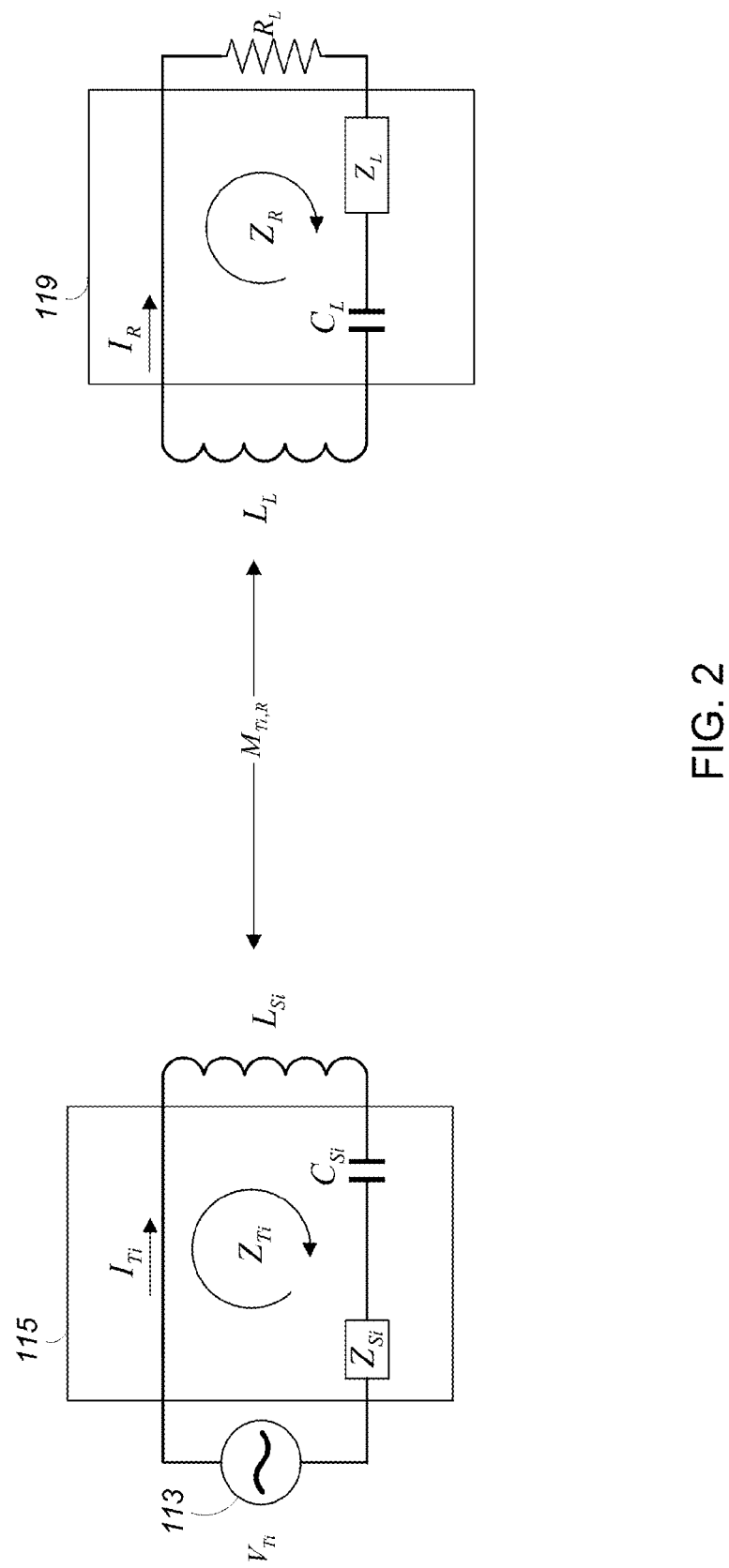
FIG. 2 is a receiver and transmitter circuit model.

Referring to FIG. 2, models of the transmitters and receivers are represented using lumped component, labeled with subscript Si ("source" i) for components associated with transmit coil Ti, and with the subscript L ("load") for components associated with the receiver R. In some examples the receiver 104 is modeled as a coil, which has an inductance $L_L$, in series with a capacitor with capacitance $C_L$, in series with a lumped element with impedance $Z_L$. The capacitance is chosen such that $L_L C_L = 1/\omega_T^2$, so that at the frequency of operation $\omega_T$ of the transmitter, the series combination of the inductor and capacitor (ideally) have zero impedance $j\omega L_L + 1/j\omega C_L$, and $Z_R = Z_L + R_L$ is the entire impedance of the loop driven by the induced voltage in the receiver coil. The receiver circuit is therefore resonant at the frequency of operation, thereby maximizing the magnitude of the current (and thereby the power transferred to the load) for a given strength of magnetic field. The transmit coils together induce an electromotive force $\epsilon_R$ which causes the receiver current to satisfy $I_R = \epsilon_R/Z_R$. Similarly, the transmitter circuit model for each of the sections of the transmitter is modeled as a controlled voltage source 113, in series with the transmit coil with inductance $L_{Si}$, in series with a capacitor with capacitance $C_{Si}$, in series with a lumped impedance $Z_{Si}$. As with the receiver, the capacitances are chosen to offset the inductance of the transmit coils as $L_{Si} C_{Si} = 1/\omega_T^2$. An electromotive force $\epsilon_{Ti}$ is induced in each transmit coil by the other transmit coils as well as the receiver coil such that $I_{Ti} = (V_{Si} + \epsilon_{Ti})/Z_{Ti}$ where $Z_{Ti} = Z_{Si}$.

The oscillating transmit coil currents $I_{Ti}$ cause oscillating magnetic flux through the receiver coil, which in turn causes the electromotive force $\epsilon_R$ in the receiver's coil 120 to the following equation:

$$\epsilon_R = -j\omega \Sigma_i M_{Ti,R} I_{Ti}$$

and therefore $$I_R = -(j\omega/Z_R) \Sigma_i M_{Ti,R} I_{Ti}.$$

Rather than expressing this relation in terms of the mutual inductances $M_{Ti,R}$, equivalent "magnetic channels" defined as $$m_{Ti,R} = j\omega M_{Ti,R}/Z_R,$$

which are dimensionless complex numbers, allowing the induced current to be expressed as $$I_R = \sum_i m_{Ti,R} I_{Ti}.$$

Similarly, the reverse channel can be expressed as $m_{R,Ti} = -j\omega M_{R,Ti}/Z_{Ti}$. Note that although the mutual inductances are symmetric such that $M_{Ti,R} = M_{R,Ti}$, the magnetic channels are asymmetric such that $m_{R,Ti} = m_{Ti,R}(Z_R/Z_{Ti})$. For a particular transmit coil Ti, the oscillating transmit coil currents $I_{Tj}$ for the other transmit coils Tj, as well as the receiver coil, cause the electromotive force $\epsilon_{Ti}$ in the transmitter coil to the following equation:

$$\epsilon_{Ti} = -j\omega(\Sigma_{j \neq i} M_{Tj,Ti} I_{Tj} + M_{R,Ti} I_R)$$

and therefore $$I_{Ti} = V_{Ti}/Z_{Ti} - (j\omega/Z_{Ti}) \Sigma_{j \neq i} M_{Tj,Ti} I_{Tj} - (j\omega/Z_{Ti}) M_{R,Ti} I_R$$

which can be expressed in terms of the channel quantities as $$I_{Ti} = V_{Ti}/Z_{Ti} + \Sigma_{j \neq i} m_{Tj,Ti} I_{Tj} + m_{R,Ti} I_R$$

3 Transmit Current Determination

In general, and as is illustrated below, the system adapts a magnitude and phase of currents in the transmit coils to avoid destructive addition of flux caused by each of the transmit coils at the receiver coil.

3.1 Illustration

Referring to FIGS. 3 and 4, operation of the system may be understood using a simplified schematic showing a linear array of five transmit coils 350 T1 . . . T5 in a base station and a receiver coil 352 R parallel (in FIG. 3) or perpendicular (in FIG. 54) to the transmit coils 350. In general, the system adapts the magnitudes and phases of currents $I_{T1} \ldots I_{T5}$ for the transmit coils 350 in order to avoid destructive addition of the flux caused by each of the transmit coils 350 on the receiver coil 352.

In FIG. 3, the receiving coil is oriented to be parallel with the transmit coils and above the center coil, T3. As is evident from the figure, the system has adapted the magnitudes and phases of currents $I_{T1} \ldots I_{T5}$ such that the directions of the magnetic fields generated by the transmit coils 350 are all the same at the receiver coil 352, causing constructive addition of the magnetic flux through the receiver coil 352.

In particular, the current $I_{T3}$ in the center coil, T3 has a magnitude of A and a phase of 0°. The currents $I_{T1}, I_{T5}$ in the first and fifth transmit coils T1, T5 each have a magnitude of C and have a phase of 180° (i.e., they are out of phase with $I_{T3}$). The currents $I_{T2}$, $I_{T4}$ in the second and fourth transmit coils T2, T4 each have a magnitude of B and have a phase of 180° (i.e., they are out of phase with $I_{T3}$). In the configuration of FIG. 3, having the first, second, fourth, and fifth transmit coils out of phase with the third transmit coil causes the first, second, fourth, and fifth transmit coils to generate a magnetic field with a polarity opposite to the polarity of the magnetic field generated by the third transmit coil. The magnetic field lines generated by all of the transmit coils 350 at the receiver coil 342 all have the same direction, resulting in constructive addition of the magnetic flux though the receiver coil.

In this case, the magnitude of the current $I_{T3}$, A is greater than the magnitude of the currents $I_{T2}$ and $I_{T4}$, B since the third transmit coil has a stronger magnetic coupling to the receiver coil than the second and fourth transmit coils. Similarly, the magnitude of the currents $I_{T2}$ and $I_{T4}$, B is greater than the magnitude of the currents $I_{T1}$ and $I_{T5}$, C since the second and fourth transmit coils have a stronger magnetic coupling to the receiver coil than the first and fifth transmit coils. That is, A>B>C.

In FIG. 4, the receiving coil has an orientation that is perpendicular to that of FIG. 3 (i.e., perpendicular to the third transmit coil, T3). As is evident from the figure, the system has adapted the magnitudes and phases of currents $I_{T1}, I_{T2}, I_{T4}, I_{T5}$ such that the directions of the magnetic fields generated by the first, second, fourth, and fifth transmit coils are all the same at the receiver coil 352, causing constructive addition of the magnetic flux through the receiver coil 342. Note that, since the third transmit coil, T3 is oriented perpendicular to the receiver coil 352, no current is applied to the third transmit coil (i.e., $I_{T3}$=0) since a magnetic field generated by the third transmit coil cannot induce a current in the receiver coil 352.

The current $I_{T1}$ in the first transmit coil T1 has a magnitude of C and has a phase of 0°. The current $I_{T2}$ in the second transmit coil T2 has a magnitude of B and has a phase of 0°. The current $I_{T4}$ in the fourth transmit coil T4 has a magnitude of B and has a phase of 180°. The current $I_{T5}$ in the fifth transmit coil T5 has a magnitude of C and has a phase of 180°. In the configuration of FIG. 4, having the first and second transmit coils out of phase with the fourth and fifth transmit coils causes the first and second transmit coils to generate a magnetic field with a polarity opposite to the polarity of the magnetic field generated by the fourth and fifth transmit coils. The magnetic field lines generated by the first, second, fourth, and fifth transmit coils at the receiver coil 342 all have the same direction, resulting in constructive addition of the magnetic flux though the receiver coil 352.

In this case, the magnitude of the currents $I_{T2}$ and $I_{T4}$, B is greater than the magnitude of the currents $I_{T1}$ and $I_{T5}$, C since the second and fourth transmit coils have a stronger magnetic coupling to the receiver coil than the first and fifth transmit coils. That is, B>C.

3.2 Detailed System Block Diagram

Figure 5:
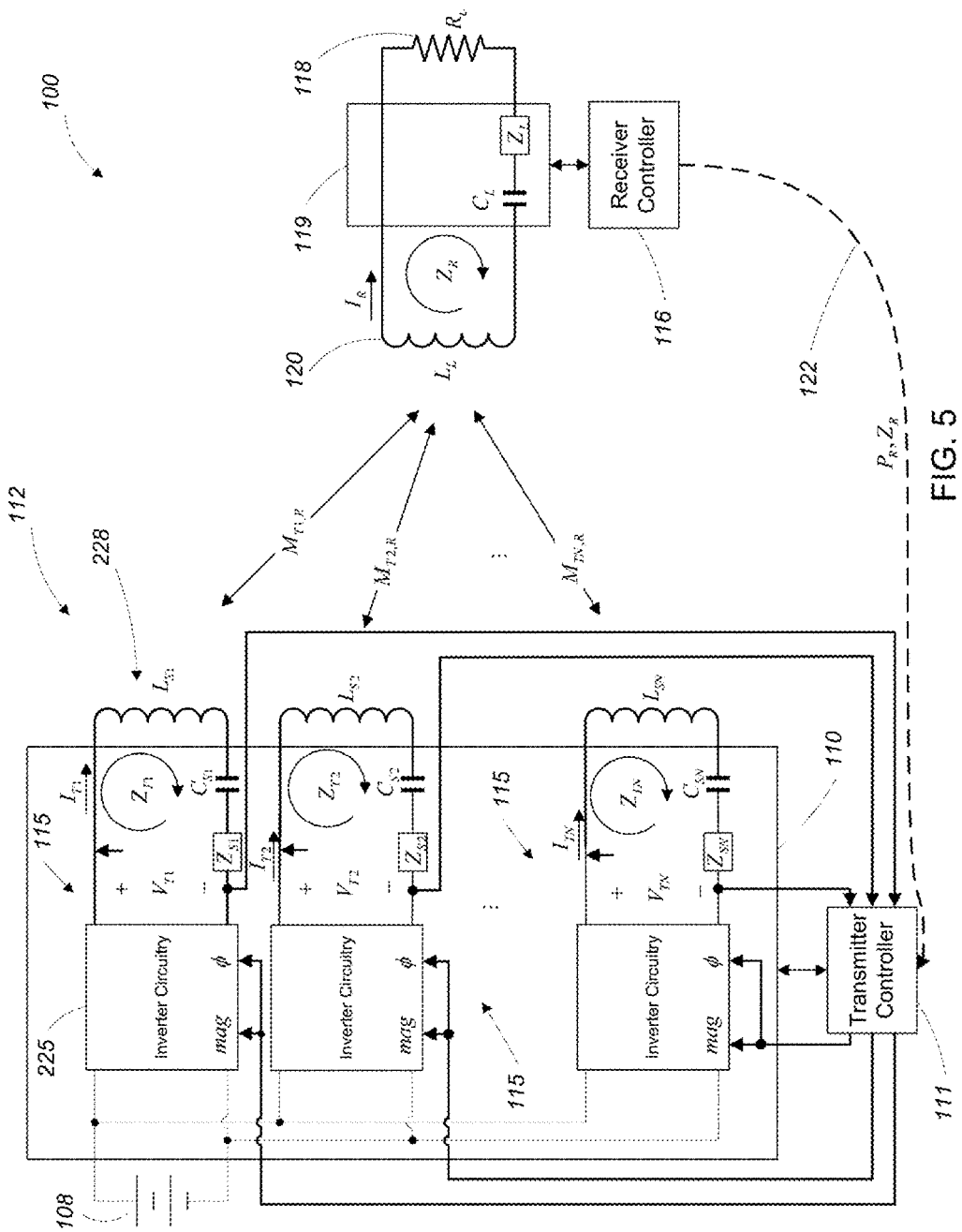
FIG. 5 is a detailed block diagram of a single receiver wireless power transfer system.

Referring to FIG. 5, in a detailed block diagram of the system of FIG. 1 the driving circuitry 110 of the transmitter 102 includes (or is generally equivalent to), for each transmit coil circuit 115, an inverter circuit 225, a capacitive element $C_{Si}$, and an intrinsic impedance of the transmit coil circuit, $Z_{Si}$. In some examples, the inverter circuit 225 may be modeled as an ideal resonant inverter circuit.

Similarly, the receiver circuit 114 includes a capacitive element $C_L$ and an intrinsic impedance of the receiver circuit, $Z_L$. As is described in detail below, the transmitter controller 111 determines the magnitudes and phases of the currents $I_{T1} \ldots I_{T5}$ for each of the transmit coils 112 and provides the determined magnitudes and phases to the mag and $\phi$ inputs of the inverter circuits 225 of the transmit coil circuits 115 for each of the transmit coils 112. Very generally, the inverter circuits 225 determine the appropriate voltages, $V_{Ti}$ to apply to the transmit coils 112 in order to achieve the determined currents $I_{T1} \ldots I_{T5}$.

3.3 Protocol

In the transmit coil current update step, the transmitter controller 111 utilizes the estimates of the magnetic channels $m_{T1,R} \ldots m_{TN,R}$ between the transmit coils 112 and the receiver coil 120 and, in some examples, additional information to determine an optimal set of currents $I_{T1} \ldots I_{TN}$ for the transmit coils 112. In some examples, the optimal set of currents deliver the target average power $P_R$ to the receiver 104 while at the same time minimizing power loss in the transmitter 102. In other examples, the optimal set of currents deliver a maximum amount of power to the receiver subject to input power limitations at the transmitter 102.

3.4 Target Receiver Power Case

As is noted above, one goal of the system when configured for target average power delivery is to achieve a desired receiver current $I_R$ while minimizing the sum of the average transmitter input powers (i.e., to minimize $$\sum_i |I_{Ti} V_{Ti}^*| ).$$

An approximation of this is to minimize $$\sum_i |I_{Ti}|^2$$

subject to $I_R = \Sigma m_{Ti,R} I_{Ti}$. A solution to this is to set $$I_{Ti} = \left(\frac{m_{Ti,R}^*}{\sum_k |m_{Tk,R}|^2}\right) I_R = \left(\frac{Z_R}{j\omega}\right)\left(\frac{M_{Ti,R}}{\sum_k M_{Tk,R}^2}\right) I_R$$

Note that $$\sum_i |I_{Ti}|^2$$

in such a case is always strictly smaller than a solution that selects the most coupled transmit coils and sets $$I_{Ti} = \begin{cases} \frac{1}{m_{T_{max},R}} I_R & T_i = T_{max} \\ 0 & \text{otherwise} \end{cases}.$$

For example, if the target average power $P_R$ and the receiver's overall loop impedance $Z_R$ are known, a target receiver current $I_R$ can be determined from the equation:

$$P_R = |I_R|^2 Re(Z_R)$$

Or $$|I_R| = \sqrt{P_R/Re(Z_R)}.$$

3.5 Input Power Limit Case

In some examples, a goal of the system is to maximize the power received by the receiver subject to a limit on the input power, rather than to match a target receiver power as discussed above. For example, given that the power source 108 may be capable of providing a maximum power, which can be approximated as $$P_T = \sum_i |I_{Ti}|^2 \mathrm{Re}(Z_{Ti}).$$

Assuming that the $Z_{Ti}$ are equal, then this power limit is equivalent to a current limit $$\sum_i |I_{Ti}|^2 = I_{max}^2.$$

One way to determine the transmit currents is to scale the current determined for a particular $I_R$ (e.g., $I_R=1$) by computing $$1.\ I_{Ti} \leftarrow \left(\frac{m^*_{Ti,R}}{\sum_k |m_{Tk,R}|^2}\right) I_R$$

$$2.\ \alpha^2 \leftarrow \sum_i |I_{Ti}|^2$$

$$3.\ I_{Ti} \leftarrow I_{max} \frac{I_{Ti}}{\alpha}$$

Note that an equivalent solution (same magnitudes but offset in phase) can be expressed only in terms of the real magnetic couplings $$I_{Ti} = \left(\frac{M_{Ti,R}}{\sum_k |M_{Tk,R}|^2}\right) I_{max}$$

3.5.1 Transmit Voltage Drive Determination

In some examples, a voltage supplied by a voltage source (e.g., the voltage source 113) is applied to the individual transmit coil circuits to generate the desired transmit coil currents $I_{Ti}$, which are governed by the set of equations $$I_{Ti} = V_{Ti}/Z_{Ti} - (j\omega/Z_{Ti})\sum_{j \ne i} M_{Tj,Ti} I_{Tj} - (j\omega/Z_{Ti}) M_{R,Ti} I_R.$$

In particular, a matrix representation of the set of equations, solving for the driving voltages $V_{T1}, V_{T2}, \ldots V_{TN}$ satisfy the matrix equation below $$\begin{pmatrix} V_{T1} \\ V_{T2} \\ \vdots \\ V_{TN} \end{pmatrix} = \begin{pmatrix} Z_{T1} & j\omega M_{T1,T2} & \ldots & j\omega M_{T1,TN} & j\omega M_{T1} \\ j\omega M_{T2,T1} & Z_{T2} & \ldots & j\omega M_{T2,TN} & j\omega M_{T2} \\ \vdots & \vdots & \ddots & \vdots & \vdots \\ j\omega M_{TN,T1} & j\omega M_{TN,T2} & \ldots & Z_{TN} & j\omega M_{TN} \end{pmatrix} \begin{pmatrix} I_{T1} \\ I_{T2} \\ \vdots \\ I_{TN} \\ I_R \end{pmatrix}$$

Once the appropriate driving voltages $V_{T1}, V_{T2}, \ldots V_{TN}$ are determined by the transmitter controller 111, the transmitter controller 111 instructs the driving circuit 110 to apply the driving voltages to the transmit coils 112, causing the optimal currents $I_{T1} \ldots I_{TN}$ to flow in the transmit coils 112.

It is noted that the magnetic channels between the transmit coils 112 and the receiver coil 120 may change since a device such as a mobile phone is likely to move. For this reason, the magnetic channel estimation and transmit coil current update steps are frequently repeated to ensure that the magnetic channels are accurate.

4 Magnetic Channel Estimation

Figure 6:
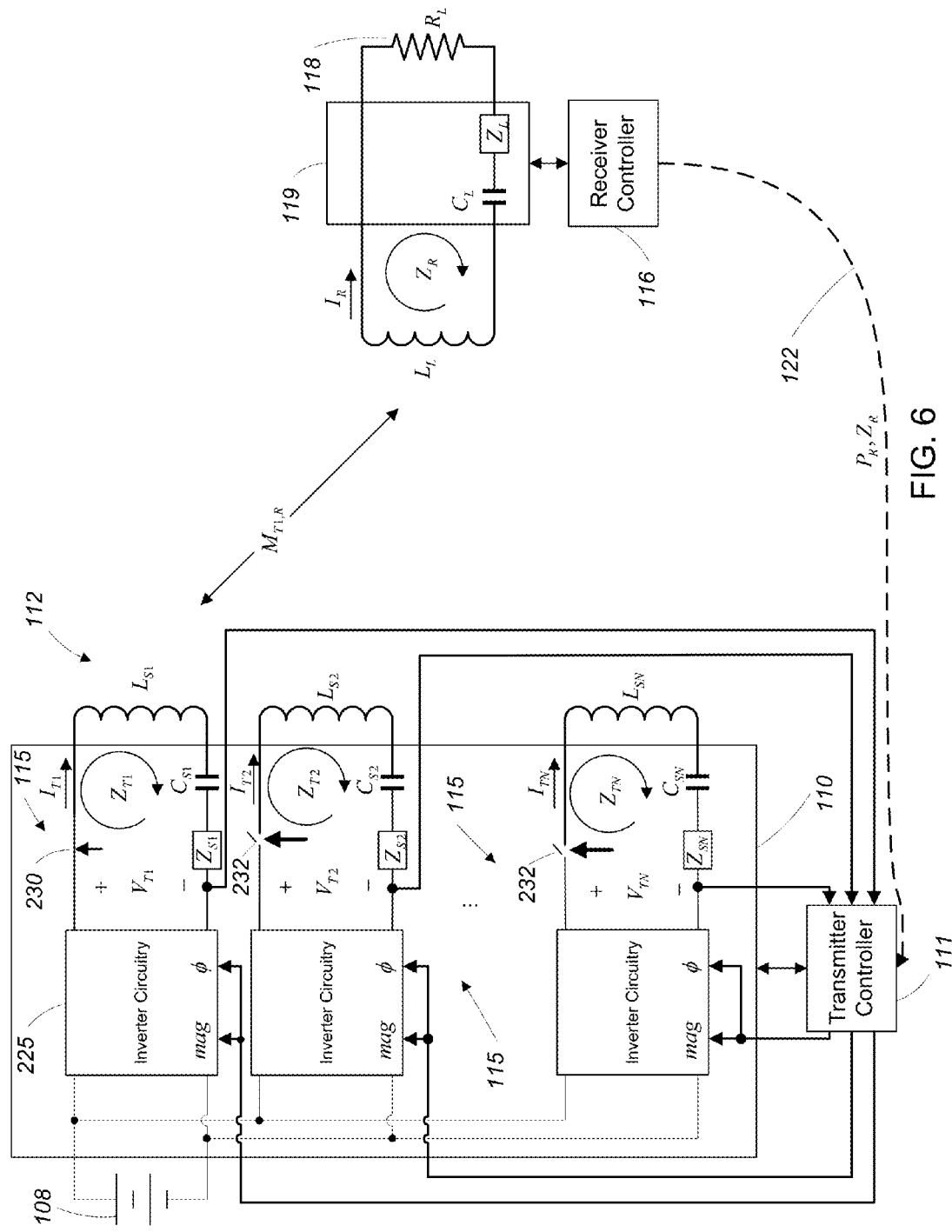
FIG. 6 is a detailed block diagram of a single receiver wireless power transfer system configured in a magnetic channel estimation mode.

Referring to FIG. 6, in one implementation, to perform the magnetic channel estimation step, the transmitter controller 111 cycles through the N transmit coils 112 Ti in turn to determine an estimate of the mutual inductance $M_{Ti,R}$ between each transmit coil and the receiver coil 120. In some examples, rather than estimating the mutual inductances $M_{Ti,Tj}$, the transmitter controller 111 uses the estimates of "magnetic channels" introduced above. In some examples, the transmitter controller 111 computes the estimates of the magnetic channels in two stages, a first stage in which the magnitudes of the mutual inductances are computed, and a second stage in which the signs of the mutual inductances are computed.

4.1 Magnitudes of the Mutual Inductances

In some examples, to determine the estimates of the magnitude of the mutual inductance between an $i^{th}$ transmit coil Ti 112 and the receiver coil R 120, the transmitter controller 111 opens a switch 232 in all of the transmit coils but the $i^{th}$ transmit coil, causing an open circuit condition in all of the transmit coils but the $i^{th}$ transmit coil. There is zero mutual inductance between the open circuit transmit coils 112 and the receiver coil 120, as well as between any pair of transmit coils 112. Generally, the approach to determining the mutual inductance between the transmit coil and the receive coil is for the transmitter to observe the loading of the transmit circuit by the receiver.

More specifically, the transmitter controller 111 applies a known oscillating voltage, $V_{Ti}$ to the $i^{th}$ transmit coil circuit. Doing so causes an alternating current $I_{Ti}$ to flow in the $i^{th}$ transmit coil circuit. The current $I_{Ti}$ flowing through the $i^{th}$ transmit coil generates an oscillating magnetic field. When the receiver coil 120 is present in the oscillating magnetic field generated by the $i^{th}$ transmit coil, it is subject to an oscillating magnetic flux. The oscillating magnetic flux causes an electromotive force (EMF) in the receiver's coil 120 according to the following equation:

$$\epsilon_R = -j\omega M_{Ti,R} I_{Ti}$$

As introduced above, the induced EMF causes an alternating current to be induced in the receiver coil's circuit.

$$I_R = -(j\omega/Z_R) M_{Ti,R} I_{Ti}$$

Due to the mutual inductance between the receiver coil and the $i^{th}$ transmit coil and 120, the receiver coil 120 induces an electromotive force in the $i^{th}$ transmit coil according to the following equation:

$$\mathcal{E}_{Ti} = -j\omega M_{R,Ti} I_R$$
$$= (j\omega M_{R,Ti})(j\omega/Z_R) M_{Ti,R} I_{Ti}$$
$$= -\omega^2 M_{Ti,R}^2 I_{Ti}/Z_R$$

In some examples, to determine the estimate $M_{Ti,R}$ of the magnetic channel between the $i^{th}$ transmit coil and the receiver coil, the voltage of applied to the $i^{th}$ transmit coil circuit is expressed using the following equation:

$$V_{Ti} = I_{Ti} Z_{Ti} + \epsilon_{Ti} = I_{Ti} Z_{Ti} - \omega^2 M_{Ti,R}^2 I_{Ti}/Z_R$$

which can be rewritten as $$V_{Ti} = I_{Ti} Z_{Ti} - I_{Ti} \Delta Z_{Ti,R} = I_{Ti} Z'_{Ti,R}$$

where $$\Delta Z_{Ti,R} = \omega^2 M_{Ti,R}^2 / Z_R$$

and therefore $$M_{Ti,R}^2 = Z_R \Delta Z_{Ti,R} / \omega^2$$

The quantity $\Delta Z_{Ti,R}$ is measured, for example, by using a fixed driving voltage $V_{Ti}$ and comparing a current $I_{Ti} = V_{Ti}/Z_{Ti}$ when the receiver does not load the transmit coil and the current $I'_{Ti,R} = V_{Ti}/Z_{Ti,R}$ when the receiver does load the transmit coil, and computing $$\Delta Z_{Ti,R} \leftarrow \left( \frac{V_{Ti}}{I_{Ti}} - \frac{V_{Ti}}{I'_{Ti,R}} \right) \text{ and }$$

$$M_{Ti,R} = \gamma_i \frac{\sqrt{Z_R \Delta Z_{Ti,R}}}{\omega}$$

where $\gamma_i$ is the sign (i.e., $\gamma_i = \pm 1$) of the mutual inductance as determined in the following section.

4.2 Signs of the Mutual Inductances

In addition to computing the magnitude of the mutual inductances, the signs of the mutual inductances are also computed. In some examples, the signs of the mutual inductances are defined with respect to a predefined reference transmit coil. For example, the mutual inductance $M_{T1,R}$ between the first transmit coil T1 and the receiver coil R can be chosen as the reference transmit coil. In this case, $M_{T1,R}$ is given a positive sign (i.e., $\gamma_i = +1$) by definition. With $M_{T1,R}$ defined as having a positive sign, the signs the remaining mutual inductances for the other transmit coils can be computed. In some examples, the computation of the signs for each of the other mutual inductances, $M_{Ti,R}$ where $i \neq 1$ involves two steps: a one time calibration step and an online sign computation step.

4.2.1 One-Time Calibration Step

In some examples, the one-time calibration step computes the mutual inductance $M_{T1,Ti}$ between the reference transmit coil (e.g., T1) and each of the other transmit coils Ti, $i \neq 1$. In general, the value of the mutual inductances between reference transmit coil and the other transmit coils is independent of the receiver and does not change over time. As such it can be determined in the absence of any receiver coil.

Figure 7:
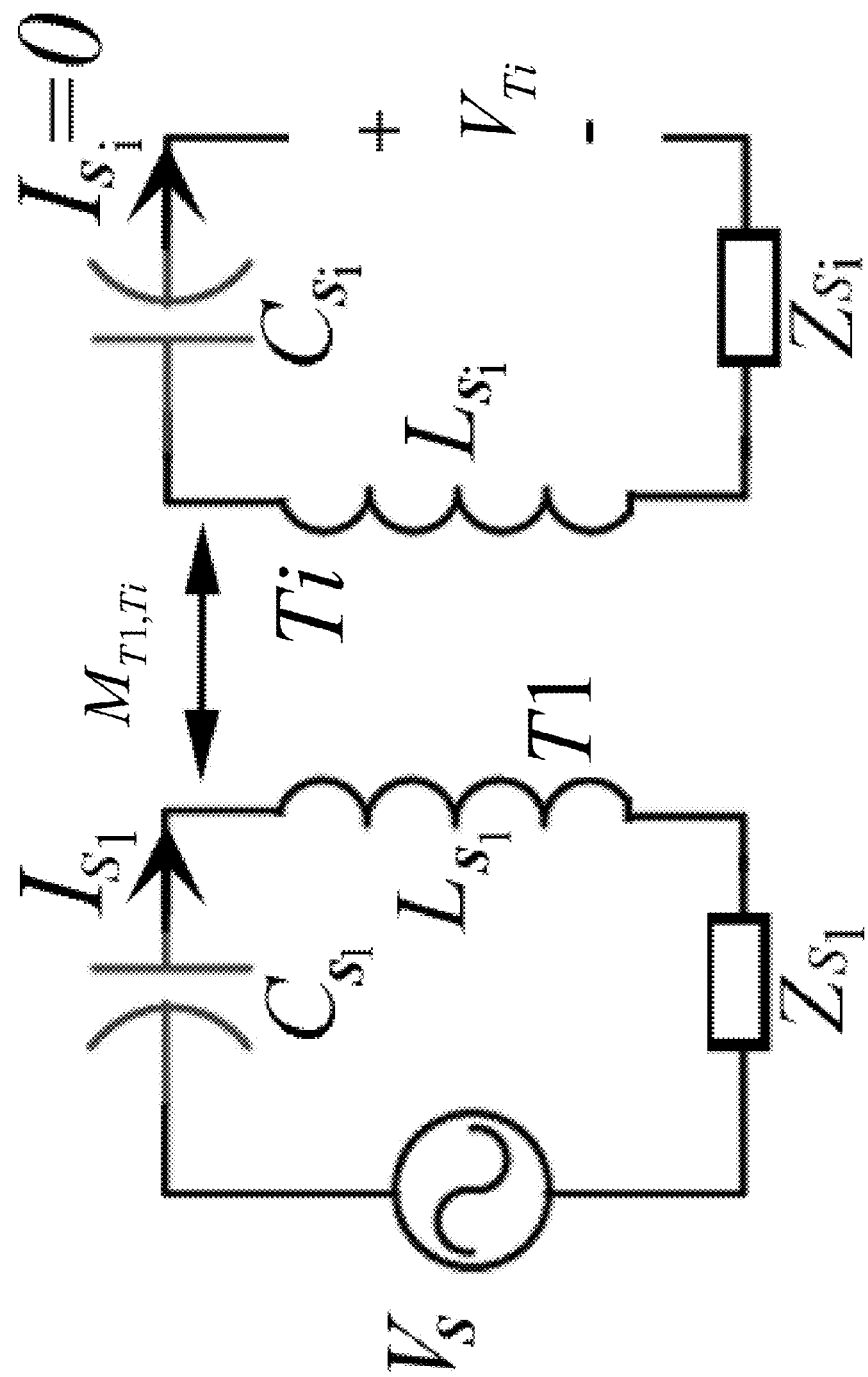
FIG. 7 is a diagram illustrating a calibration phase of a mutual inductance sign determination method.

Referring to FIG. 7, to determine the mutual inductance $M_{T1,Ti}$ between the reference transmit coil T1 and a $i^{th}$ transmit coil Ti, a source voltage $V_{Ti}$ is applied to the reference transmit coil while all of the transmit coils other than the reference transmit coil are open-circuited. The exemplary configuration shown in FIG. 7, includes only the reference transmit coil T1 and the $i^{th}$ transmit coil, Ti and excludes any other transmit coils (which is feasible since they are open circuited). With the reference transmit coil circuit operating at its resonant frequency, any terms involving L and C cancel each other. Furthermore, the current in the $i^{th}$ transmit coil's circuit, $I_{Si} = 0$ since the $i^{th}$ transmit coil is open circuited. Using basic circuit equations, $V_S$ can be expressed as:

$$V_S = I_{S1} Z_{S1}$$

and $V_{Ti}$ can be expressed as:

$$V_{Ti} = -j\omega M_{T1,Ti} I_{S1}.$$

Solving the above equations for $M_{T1,Ti}$ results in:

$$M_{T1,Ti} = -\frac{V_{Ti}}{V_S} \cdot \frac{Z_{S1}}{j\omega}$$

where $V_S$ and $Z_{s1}$ are known, w is the resonance frequency, and $V_{Ti}$ is directly measured from the $i^{th}$ transmit coil circuit. Hence, the above equation provides the value of $M_{T1,Ti}$.

4.2.2 Online Computation of the Sign of the Mutual Inductances

As is noted above, each of the mutual inductances between the transmit coils 112 and the receiver coil 120 include a $\gamma_i$ term which represents the sign of the mutual inductance. Without the sign term $\gamma_i$, the mutual inductances are essentially a magnitude of the mutual inductance. Based on the above calibration step, it is known that the sign of mutual inductance between the reference coil and the receiver coil, $M_{T1,R}$ is positive and $M_{T1,TR}$ is therefore fully known. The values of the mutual inductances between the reference transmit coil and the other transmit coils, $M_{T1,Ti}$ are also known from the above-calibration step.

Figure 8:
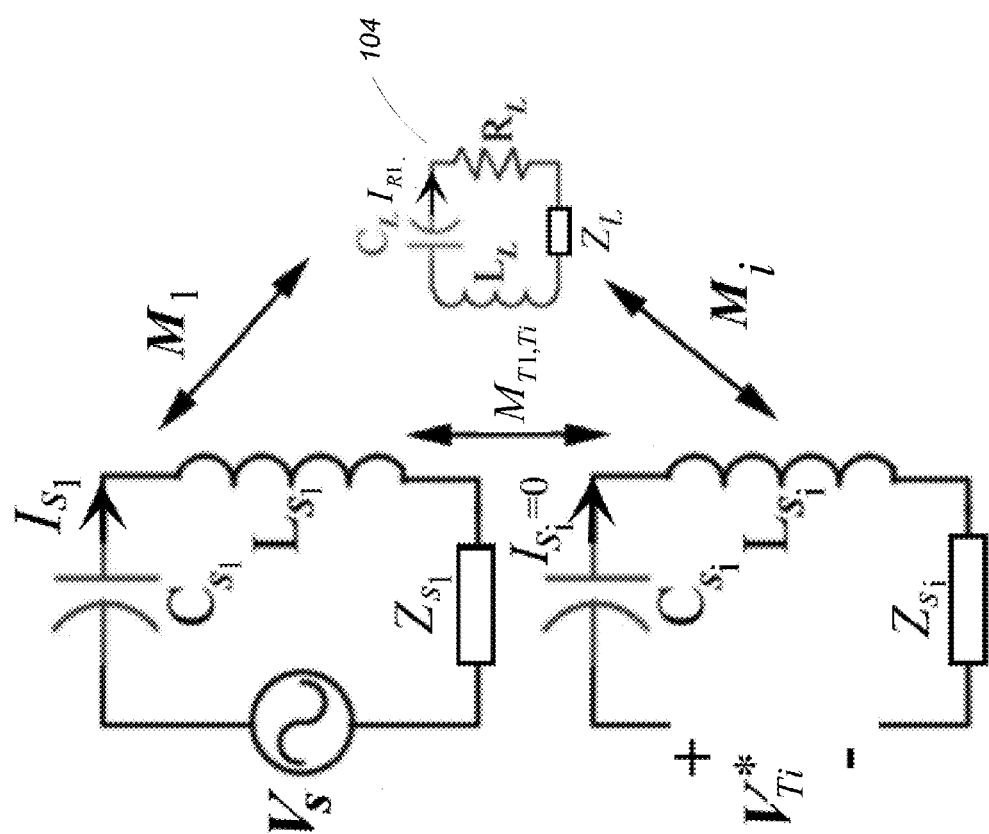
FIG. 8 is a diagram illustrating a computation step of a mutual inductance sign determination method.

Referring to FIG. 8, given the above information, the signs of the unknown mutual inductances, $M_{Ti,R}$ can be determined. To do so, in the presence of the receiver 104, and during the channel estimation procedure, the source voltage $V_S$ is applied to the reference coil, T1 while leaving all other transmit coils are open circuited. Applying basic circuit equations to the receiver coil yields:

$$-j\omega M_{T1,R} I_{S1} = I_{R1}(R_L + Z_L)$$

which can be rearranged as:

$$I_{R1} = -\frac{j\omega M_{T1,R} I_{S1}}{(R_L + Z_L)}$$

Applying basic circuit equations to the reference transmit coil yields:

$$V^*_{Ti} = j\omega M_{T1,Ti} I_{S1} + j\omega M_{Ti,R} I_{R1}$$

Substituting $I_{R1}$ into the previous equations yields:

$$j\omega M_{Ti,R} = \frac{V^*_{Ti} - j\omega M_{T1,Ti} I_{S1}}{I_{R1}}$$

In the above equation, all values are known, except for the sign of $M_{Ti,R}$. Specifically, $V^*_{Ti}$ and $I_{S1}$ can be directly measured at the transmitter. $M_{T1,Ti}$ is known from the calibration step, and $I_{R1}$ can estimated as is shown above, where all other values are known. Finally, the sign of $M_{Ti,R}$ can be determined as:

$$\text{sign}(M_{Ti,R}) = \text{sign}\left( \frac{V^*_{Ti} + j\omega M_{T1,Ti} I_{S1}}{j\omega I_{R1}} \right)$$

The above-determined sign of $M_{Ti,R}$ is set as the value of $\gamma_i$.

It is noted that, since mutual inductances are real numbers (including no imaginary part), the sign above is well-defined (i.e., the value on the right hand side of the equation inside the sign function is real and has a well-defined sign). It is also noted that $M_{T1,R}$ could have been defined as having a negative sign. In such a case all of the mutual inductances, $M_{Ti,R}$ would flip sign, and the voltages induced by the transmit coils at the receiver coil would also flip sign, without any change in the power delivered to the receiver.

4.3 Magnetic Channel Computation

As introduced above, $$M_{Ti,R} = \gamma_i \frac{\sqrt{Z_R \Delta Z_{Ti,R}}}{\omega} \text{ and } m_{Ti,R} = -j\omega M_{Ti,R}/Z_R$$

Therefore, the magnetic channel between the $i^{th}$ transmit coil and the receiver coil 120 is expressed as:

$$m_{Ti,R} = \gamma_i j \sqrt{\frac{\Delta Z_{Ti,R}}{Z_R}}$$

recalling that the current $I_R$ induced by the $i^{th}$ transmit coil in the receiver coil 120 is:

$$I_R = m_{Ti,R} I_{Ti}$$

As is noted above, the above magnetic channel estimation procedure is performed for each of the transmit coils 112 in the transmitter 102, resulting in N magnetic channel estimates, $m_{T1,R}, m_{T2,R}, \ldots m_{TN,R}$.

In some examples, when the transmit coil circuits 115 include capacitive elements (as in FIG. 2), the effects of the impedance of the capacitive elements cancel the effects of the impedance of the inductive elements (i.e., the transmit coils) at a resonant frequency, $\omega_T$. In some examples, this cancellation of impedances results in an impedance of the receiver 104 being $Z_R = Z_L + R_L$. In such cases the magnetic channels are expressed as:

$$m_{Ti,R} = \gamma_i j \sqrt{\frac{\Delta Z_{Ti,R}}{Z_L + R_L}}$$

In some examples, the magnetic channels between the transmit coils 112 are known a-priori. In other examples, the magnetic channels between the transmit coils 112 are determined in a similar manner as described above.

5 Receiver Feedback

As is noted above, the receiver controller 116 of the receiver 104 provides feedback to the transmitter 102 over a communications channel 122. In some examples, when a target receiver power is desired, the feedback from the receiver 104 includes an indication of the overall loop impedance $Z_R$ of the receiver circuit as well as the target power, $P_R$. In some examples, the feedback is also used as an indication as to whether the receiver 104 is within range of the transmitter 102.

In some examples, the receiver's overall loop impedance, $Z_R$ changes over time. For example, when charging a rechargeable battery the effective load resistance 118, $R_L$, of the receiver may continuously increase as the instantaneous charge level of the battery increases. In some examples, this increase in the load resistance 118 results in full charging when the instantaneous charge level of the battery is low and trickle charging when the instantaneous charge level of the battery is high. Of course, an increase in the load resistance 118 results in an increase in the receiver's overall loop impedance, $Z_R$. Thus, to maintain correct estimates of the magnetic channels between the transmitter coils 112 and the receiver coil 120 and to ensure that the correct power is received at the receiver 104, the receiver controller 116 periodically transmits the receiver's overall loop impedance back to the transmitter 102 over the communications channel 122.

In some examples, the overall loop impedance $Z_R$ is communicated in-band to the transmitter 102. For example, the receiver 104 may leverage the fact that receiving any amount of power in the near field region can cause some portion of the energy transmitted by the transmitter 102 to reflect back to the transmitter 102. That is, any change in the receiver coil's circuit reflects an impedance back to the transmit coil 112. In some examples, the receiver may modulate its reflected impedance to the transmitter 102. For example, a switch in the receiver's circuit may toggle at a low rate (e.g., 300 Hz) to generate a pulse train of reflected impedance. In some examples, when the transmitter 102 and receiver are resonantly coupled, the pulse train is further modulated by the transmitter's resonant frequency (e.g., 1 MHz). In some examples, the receiver modulates the reflected impedance such that the pulse widths are proportional to the overall loop impedance. In some examples, the modulation of the receiver's reflected impedance is repeated a number of times to ensure that the transmitter reliably receives the receiver's overall loop impedance.

In some examples, the width of the pulses is designed to be linearly distributed between 20% and 80% of the highest overall loop impedance for the receiver 120.

In some examples, the overall loop impedance $Z_R$ is communicated out of-band to the transmitter 102. For example, the receiver 104 may use a low-power radio (e.g. Bluetooth Low Energy communications) to convey the overall loop impedance of the receiver circuit to the transmitter 102.

In some examples, the target power, $P_R$ is also communicated to the transmitter 102 using either the in-band or out of-band techniques described above.

In some examples, the transmitter 102 is configured to sense the pulses generated by the receiver 102 as an indication that the receiver 102 is in range and should be charged. If the transmitter 102 does not sense any receivers in range, it may cease powering its transmit coils 112 until it detects an in range receiver in range.

In some examples, the overall loop impedance of the receiver 104 $Z_R$, and the target power, $P_R$ is communicated to the transmitter 102 periodically (e.g., every 5 minutes).

In some examples, when transmitting a maximum amount of power to the receiver, subject to input power limitations, there is no requirement for the receiver to communicate $Z_R$ or $P_R$ to the transmitter. In such cases, other information such as an indication as to whether the receiver is proximal to the transmitter may still be transmitted over the communication channel.

In some examples, rather than communicating the target power $P_R$ to the transmitter 102, the receiver controller 116 instead communicates a target receiver current $I_R$ and a target receiver voltage $V_R$. In other examples, the receiver controller may communicate other quantities (i.e., a voltage and/or current at the load) to the transmitter 102.

6 Circuit Implementations

Figure 9:
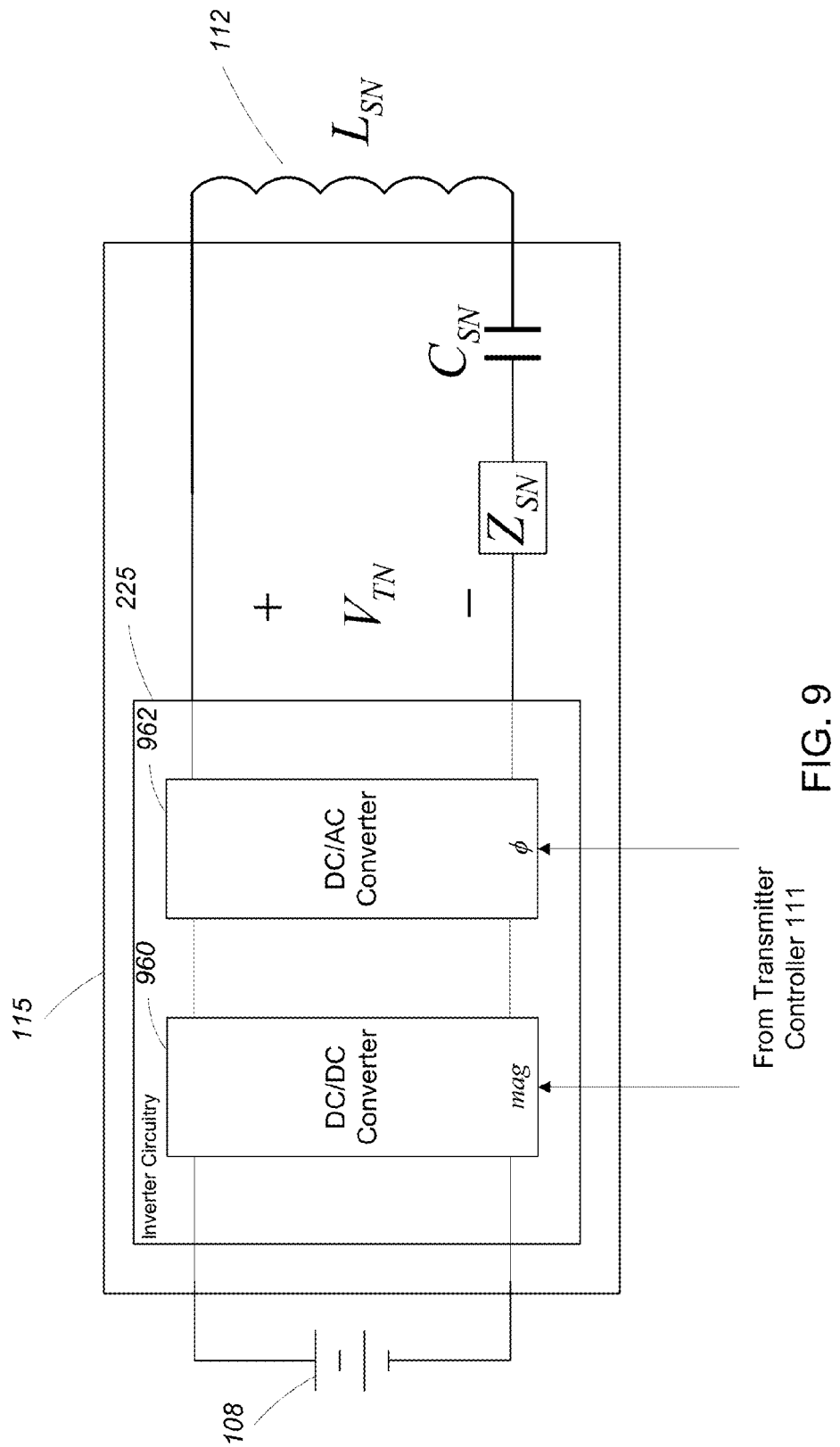
FIG. 9 is a transmitter circuit.
Figure 10:
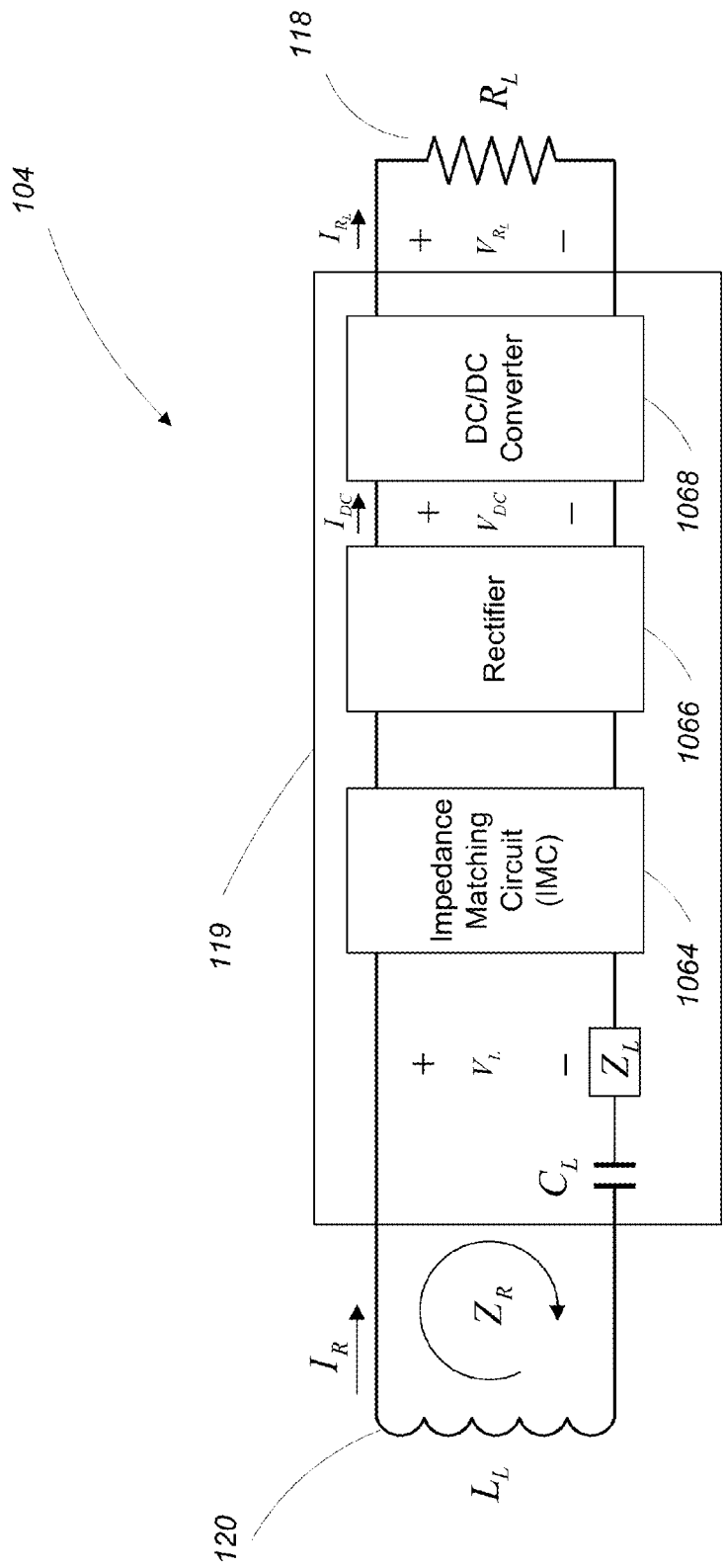
FIG. 10 is a receiver circuit.

Examples of circuit implementations for the transmitter and receiver are shown in FIGS. 9 and 10, respectively.

Referring to FIG. 9, a block diagram of an embodiment the circuitry for one of the transmit coils 112 of the transmitter 102 includes the transmit coil 112 and a transmit coil circuit 115. The transmit coil circuit 115 includes inverter circuitry 225, a capacitive element, $C_{SN}$ and a lumped impedance $Z_{SN}$. The power supply 108 (e.g., battery, constant voltage DC power supply connect to utility power, solar panel, etc.) provides a DC supply voltage as input to the inverter circuitry 225.

The inverter circuitry 225 includes a DC/DC converter 960 and a DC/AC converter 962. The DC/DC converter 960 receives the DC supply voltage from the power supply 108 and scales the DC supply voltage according to an amplitude control signal received from the transmitter controller 111. The scaled DC voltage output of the DC/DC converter 960, is provided as input to the DC/AC converter 962 which converts the scaled DC voltage to an AC voltage output having a desired frequency. The DC/AC converter 960 also shifts a phase (i.e., ϕ) of the AC voltage output according to a phase control signal received from the transmitter controller 111. The AC voltage output, $V_{TN}$ of the DC/AC converter 960 is a transmit coil driving voltage with a frequency, amplitude, and phase specified by the transmitter controller 111.

In some examples, the DC/DC converter 960 is implemented as a switched inductor regulating circuit, such as a Boost, Buck, or Boost-Buck converter. In some examples, the DC/AC converter 962 (including the inductance of the transmit coil and the corresponding capacitance in series with the transmit coil) forms a class E resonant inverter. In some examples, a phase shifter (not shown) implemented in the DC/AC converter 962 effectively modifies the timing of the inverter in order to achieve the desired phase of the driving voltage.

Referring to FIG. 10, one embodiment of the circuitry for a receiver coil 120 is shown. In FIG. 10, the receiver 104 includes a receiver coil 120 a load resistance 118, and receiver coupling circuitry 119. Receiver coupling circuitry 119 includes a capacitive element $C_L$, a lumped receiver impedance 4, an Impedance Matching Circuit (IMC) 1064, a rectifier 1066, and a DC/DC converter 1068. Very generally, the IMC 1064 is used to maintain relatively constant impedance. The output voltage of the IMC 1065 is passed to the rectifier 1066 (e.g., a conventional bridge rectifier circuit), the output of which is then passed through the DC/DC converter 1068 (e.g., a Boost, Buck, or Boost-Buck converter) to the load 118 at the receiver 104. Note that in the discussion above in which the load is treated as purely resistive, in these examples, it should be clear that the load is not necessarily an ideal resistance. Nevertheless, the receiver provides an effective load to the transmitter, which adjusts the transmitting characteristics accordingly.

In some examples, the overall loop impedance $Z_R$ reported to the transmitter 102 by the receiver 104 differs from the impedance of the load 118. In some examples, the overall loop impedance $Z_R$ reported to the transmitter 102 by the receiver 104 may be determined by the receiver controller 116 using, among other quantities, the output voltage of the rectifier 1066 $V_{DC}$, the output of the DC/DC converter 1068 $V_{R_l}$, the current at the load 118 $I_{R_L}$.

7 Multiple Receivers

The discussion above focuses on a case in which there is a single receiver. The approach to handing multiple receivers follows the same approach. With receivers, with target currents $\underline{I}_R = (I_{R1}, \ldots, I_{RM})^T$ and are determined by the transmit coil currents $\underline{I}_T = (I_{T1}, \ldots, I_{TN})^T$. In the multiple receiver case, one considers the mutual inductance $M_{i,j}$ between all pairs of coils. Following a similar exposition as in the single-receiver case, the induced EMF at any coil j (i.e., j is either a receiver or transmitter coil) can be expressed as $$\varepsilon_j = -j\omega \sum_{i \neq j} M_{i,j} I_i$$

and therefore the currents satisfy $$z_i I_i = \begin{cases} \varepsilon_i & i \in \text{Receivers} \\ \varepsilon_i + V_i & i \in \text{Transmiters} \end{cases}$$

In matrix form, the relationship between transmitter driving voltages and the transmitter and receiver coil currents can be expressed as $$\begin{bmatrix} Z_T & 0 \\ 0 & Z_R \end{bmatrix} \begin{bmatrix} \underline{I}_T \\ \underline{I}_R \end{bmatrix} = -j\omega \begin{bmatrix} M_{TT} & M_{RT} \\ M_{TR} & M_{RR} \end{bmatrix} \begin{bmatrix} \underline{I}_T \\ \underline{I}_R \end{bmatrix} + \begin{bmatrix} \underline{V}_T \\ 0 \end{bmatrix}$$

or equivalently $$\left( \begin{bmatrix} Z_T & 0 \\ 0 & Z_R \end{bmatrix} + j\omega \begin{bmatrix} M_{TT} & M_{RT} \\ M_{TR} & M_{RR} \end{bmatrix} \right) \begin{bmatrix} \underline{I}_T \\ \underline{I}_R \end{bmatrix} = \begin{bmatrix} \underline{V}_T \\ 0 \end{bmatrix}$$

where $$Z_T = diag(Z_{T1}, \ldots, Z_{TN})$$
$$Z_R = diag(Z_{R1}, \ldots, Z_{RM})$$
$$M_{TT}[i,j] = \begin{cases} M_{Ti,Tj} & i \neq j \\ 0 & i = j \end{cases}$$
$$M_{TR}[i,j] = M_{Ti,Rj}$$
$$M_{RT} = M_{TR}^T$$
$$M_{RR}[i,j] = \begin{cases} M_{Ri,Rj} & i \neq j \\ 0 & i = j \end{cases}$$

Note that in the case of a single receiver (M=1) the above matrix form reverts to $$\begin{bmatrix} Z_T & 0 \\ 0 & Z_{R1} \end{bmatrix} \begin{bmatrix} I_T \\ I_R \end{bmatrix} = -j\omega \begin{bmatrix} M_{TT} & M_{RT} \\ M_{TR} & M_{RR} \end{bmatrix} \begin{bmatrix} I_T \\ I_R \end{bmatrix} + \begin{bmatrix} V_T \\ 0 \end{bmatrix}$$

and therefore $$\underline{I}_{R1} = -j\omega Z_{R1}^{-1} M_{TR} \underline{I}_T, \text{ and}$$

$$\underline{I}_T = -j\omega Z_T^{-1} M_{TT} \underline{I}_T - j\omega Z_T^{-1} M_{RT} \underline{I}_{R1} + Z_T^{-1} \underline{V}_T$$

More generally, with M>1, $t\underline{I}_T = (I_{T1}, \ldots, I_{TN})^T$ the transmit coil currents are related to the receiver coil currents as $$j\omega M_{TR}\underline{I}_T+(Z_R+j\omega M_{RR})\underline{I}_R=0$$

or $$-j\omega(Z_R+j\omega M_{RR})^{-1}M_{TR}\underline{I}_T=\underline{I}_R$$

which can be expressed as $$\mathcal{M}_{TR}\underline{I}_T=\underline{I}_R$$

Note that in the case of a single receiver (M=1), $M_{RR}=0$ and $$\mathcal{M}_{TR} = \left[\frac{-j\omega}{Z_R}M_{T1,R1} \ldots \frac{-j\omega}{Z_R}M_{TN,R1}\right].$$

The general minimum norm solution for $\underline{I}_T=(I_{T1}, \ldots, I_{TN})^T$ (i.e., to minimize $\Sigma_i|I_{Ti}|^2$) is $$\underline{I}_T=\mathcal{M}_{TR}^+\underline{I}_R=(\mathcal{M}_{TR}^T\mathcal{M}_{TR})^{-1}\mathcal{M}_{TR}^T\underline{I}_R$$

and the driving voltages are then determined as $$\underline{V}_T=(Z_T+j\omega M_{TT})\underline{I}_T+j\omega M_{RT}\underline{I}_R$$

The discussion above for the single receiver case describes how to determine the mutual inductances between the transmit coils (i.e., the matrix $M_{TT}$) as well as the mutual inductances between the transmit coils and the receive coils (i.e., the $M_{TR}=M_{RT}^T$). In the multiple receiver case, the inter-receiver mutual inductances (i.e., the $M_{RR}$). Although in some situations, for example, if the receivers are very widely spaced, these mutual inductances may be ignored, in general this is not desirable. A variety of ways can be used to estimate the terms, of which there are M(M−1)/2. In one approach the transmit controller instructs the receivers such that only two receiver, $R_j$ and $R_k$, have their coils connected and providing a load, and only transmit coil $T_i$ is driven and connected. In this configuration, the currents and driving voltage $$\begin{bmatrix} Z_{Ti} & j\omega M_{Ti,Rj} & j\omega M_{Ti,Rk} \\ j\omega M_{Ti,Rj} & Z_{Rj} & j\omega M_{Rj,Rk} \\ j\omega M_{Ti,Rk} & j\omega M_{Rj,Rk} & Z_{Rk} \end{bmatrix}\begin{bmatrix} I_{Ti} \\ I_{Rj} \\ I_{Rk} \end{bmatrix}=\begin{bmatrix} V_{Ti} \\ 0 \\ 0 \end{bmatrix}$$

These three equation have three unknowns, $M_{Rj,Rk}$, $I_{Rj}$, and $I_{Rk}$ with all the other terms being known or measurable. Therefore, the desired quantity $M_{Rj,Rk}$ is determined by finding a solution (recognizing that the constraints in the unknowns are not linear in the unknowns). This process is repeated M(M−1)/2 to determine all the needed inter-receiver quantities.

8 Alternatives

In some examples, rather than optimizing the currents at the transmitter to achieve a target power at the receiver coil, the currents at the transmitter are optimized to maximize the power delivered to the receiver coil.

It is noted that various non-limiting embodiments described herein may be used separately, combined or selectively combined for specific applications.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

9 Implementations

Systems that implement the techniques described above can be implemented in software, in firmware, in digital electronic circuitry, or in computer hardware, or in combinations of them. The system can include a computer program product tangibly embodied in a machine-readable storage device for execution by a programmable processor, and method steps can be performed by a programmable processor executing a program of instructions to perform functions by operating on input data and generating output. The system can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

It is to be understood that the foregoing description is intended to illustrate and not to limit the scope of the invention, which is defined by the scope of the appended claims. Other embodiments are within the scope of the following claims.

It is further to be understood that the above-described arrangements are only illustrative of the application of the principles of the present invention. Numerous modifications and alternative arrangements may be devised by those skilled in the art without departing from the scope of the invention, and the appended claims are intended to cover such modifications and arrangements.

What is claimed is:

1. A method, comprising:
   determining, by a base station comprising a plurality of transmitting coils, a first plurality of mutual magnetic parameters, each mutual magnetic parameter of the first plurality of mutual magnetic parameters being associated with a transmitting coil of the plurality of transmitting coils and a receiving coil of at least one receiving coil associated with at least one electronic device remotely located from and to be remotely charged by the base station;
   determining, by the base station, a second plurality of mutual magnetic parameters, each mutual magnetic parameter of the second plurality of mutual magnetic parameters being associated with a different pair of transmitting coils of the plurality of transmitting coils;
   determining, by the base station, a plurality of control signals based on the first plurality of mutual magnetic parameters and the second plurality of mutual magnetic parameters, each control signal of the plurality of control signals being associated with a corresponding transmitting coil of the plurality of transmitting coils;

providing each control signal of the plurality of control signals to a driving circuit coupled to the control signal's corresponding transmitting coil; and using each control signal of the plurality of control signals to cause the driving circuit coupled to the control signal's corresponding transmitting coil to cause a current with a magnitude and phase determined from the control signal to flow in the corresponding transmitting coil.

2. The method of claim 1 wherein the at least one receiving coil includes a plurality of receiving coils.

3. The method of claim 2 further comprising determining, by the base station, a third plurality of mutual magnetic parameters, each mutual magnetic parameter of the third plurality of mutual magnetic parameters being associated with a different pair of receiving coils of the plurality of receiving coils, wherein determining the plurality of control signals if further based on the third plurality of mutual magnetic parameters.

4. The method of claim 1 wherein the plurality of control signals is determined to achieve a maximum wireless energy transfer to the at least one of the receiving coils subject to a power constraint at the base station.

5. The method of claim 1 further comprising receiving an indication of a power requirement at the base station from the electronic device, wherein determining the plurality of control signals is further based on the indication.

6. The method of claim 5 wherein the plurality of control signals is determined such that the power requirement is achieved at the receiver.

7. The method of claim 1 further comprising receiving an indication of an impedance at the receiver from the receiver, wherein determining the plurality of control signals is further based on the indication of the impedance at the receiver.

8. The method of claim 7 wherein the plurality of control signals is determined such that a power requirement is achieved at the receiver.

9. The method of claim 1, wherein each mutual magnetic parameter comprises a mutual inductance.

10. The method of claim 1, wherein each control signal of the plurality of control signals includes at least one of a coil current magnitude, a coil current phase, a coil voltage magnitude, and a coil voltage phase.

11. The method of claim 1, further comprising receiving an indication that the electronic device is in a range for charging and needs to be charged from the electronic device prior to determining the mutual magnetic parameters.

12. The method of claim 11, wherein said indication is based at least in part on the value of a load of the at least one receiving coil of the at least one electronic device.

13. The method of claim 1, wherein the determining, providing, and using are repeated in a predefined time interval.

14. The method of claim 13, wherein the predefined time interval is between two and ten seconds.

15. The method of claim 1, wherein the determining, providing, and using are performed for any orientation of the electronic device relative to the base station.

16. The method of claim 1, wherein the electronic device is a mobile phone, a smart phone, a tablet, a camera-phone or a portable computer.

17. A wireless energy transfer apparatus comprising:
a base station including a plurality of transmitting coils;
a plurality of driving circuits, each driving circuit of the plurality of driving circuits being coupled to a corresponding transmitting coil of the plurality of transmitting coils; and a controller configured to:
determine a first plurality of mutual magnetic parameters, each mutual magnetic parameter of the first plurality of mutual magnetic parameters being associated with a transmitting coil of the plurality of transmitting coils and a receiving coil of at least one receiving coil associated with at least one electronic device remotely located from and to be remotely charged by the base station;

determine a second plurality of mutual magnetic parameters, each mutual magnetic parameter of the second plurality of mutual magnetic parameters being associated with a different pair of transmitting coils of the plurality of transmitting coils;

determine a plurality of control signals based on the first plurality of mutual magnetic parameters and the second plurality of mutual magnetic parameters, each control signal of the plurality of control signals being associated with a corresponding transmitting coil of the plurality of transmitting coils;

provide each control signal of the plurality of control signals to the driving circuit coupled to the control signal's corresponding transmitting coil; and use each control signal of the plurality of control signals to cause the driving circuit coupled to the control signal's corresponding transmitting coil to cause a current with a magnitude and phase determined from the control signal to flow in the corresponding transmitting coil.

18. The wireless energy transfer apparatus of claim 17 wherein the at least one receiving coil includes a plurality of receiving coils.

19. The wireless energy transfer apparatus of claim 18 wherein the controller is further configured to determine a third plurality of mutual magnetic parameters, each mutual magnetic parameter of the third plurality of mutual magnetic parameters being associated with a different pair of receiving coils of the plurality of receiving coils, wherein determining the plurality of control signals if further based on the third plurality of mutual magnetic parameters.

20. The wireless energy transfer apparatus of claim 17 wherein the controller determines the plurality of control signals to achieve a maximum wireless energy transfer to the at least one of the receiving coils subject to a power constraint at the base station.

21. The wireless energy transfer apparatus of claim 17 wherein the controller receives an indication of a power requirement at the base station from the electronic device and determines the plurality of control signals based at least in part on the indication.

22. The wireless energy transfer apparatus of claim 21 wherein the controller determines the plurality of control signals such that the power requirement is achieved at the receiver.

23. The wireless energy transfer apparatus of claim 17 wherein the controller receives an indication of an impedance at the receiver from the receiver and the controller determines the plurality of control signals is based at least in part on the indication of the impedance at the receiver.

24. The wireless energy transfer apparatus of claim 23 wherein the controller determines the plurality of control signals such that a power requirement is achieved at the receiver.

25. The wireless energy transfer apparatus of claim 17, wherein each mutual magnetic parameter comprises a mutual inductance.

26. The wireless energy transfer apparatus of claim 17, wherein each control signal of the plurality of control signals includes at least one of a coil current magnitude, a coil current phase, a coil voltage magnitude, and a coil voltage phase.

27. The wireless energy transfer apparatus of claim 17, wherein the controller receives an indication that the electronic device is in a range for charging and needs to be charged from the electronic device prior to determining the mutual magnetic parameters.

28. The wireless energy transfer apparatus of claim 27, wherein said indication is based at least in part on the value of a load of the at least one receiving coil of the at least one electronic device.

29. The wireless energy transfer apparatus of claim 17, wherein the controller is configured to repeat the determining, providing, and using in a predefined time interval.

30. The wireless energy transfer apparatus of claim 29, wherein the predefined time interval is between two and ten seconds.

31. The wireless energy transfer apparatus of claim 17, wherein the controller is configured to perform the determining, providing, and using for any orientation of the electronic device relative to the base station.

32. The wireless energy transfer apparatus of claim 17, wherein the electronic device is a mobile phone, a smart phone, a tablet, a camera-phone or a portable computer.

* * * * *